United States Patent
Mishra et al.

(10) Patent No.: US 7,881,755 B1
(45) Date of Patent: Feb. 1, 2011

(54) WIRELESS LAN POWER SAVINGS

(75) Inventors: Partho Mishra, Cupertino, CA (US); Sandesh Goel, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 905 days.

(21) Appl. No.: 11/351,232

(22) Filed: Feb. 9, 2006

Related U.S. Application Data

(60) Provisional application No. 60/685,468, filed on May 26, 2005, provisional application No. 60/759,474, filed on Jan. 17, 2006.

(51) Int. Cl.
*H04B 1/38* (2006.01)
(52) U.S. Cl. .................. 455/574; 713/320; 713/324
(58) Field of Classification Search .......... 370/431, 370/463, 310, 311; 455/73, 550.1, 572, 574, 455/91, 127.1, 127.5, 130, 334, 343.1, 343.2, 455/343.3, 343.4, 343.5; 327/524, 530, 544; 340/500, 531, 539.1, 539.3, 825, 825.36, 340/7.2, 7.32; 713/310, 320, 321, 322, 323, 713/324, 330, 340
See application file for complete search history.

(56) References Cited

U.S. PATENT DOCUMENTS

| | | | | |
|---|---|---|---|---|
| 5,983,353 | A * | 11/1999 | McHann, Jr. ................ | 713/310 |
| 6,072,987 | A * | 6/2000 | Willey ....................... | 340/7.43 |
| 6,104,937 | A * | 8/2000 | Fujimoto .................... | 455/574 |
| 6,493,824 | B1 * | 12/2002 | Novoa et al. ................ | 713/162 |
| 7,142,139 | B2 * | 11/2006 | Efland et al. ............... | 341/126 |
| 7,505,795 | B1 * | 3/2009 | Lim et al. .................... | 455/574 |
| 2001/0015963 | A1 * | 8/2001 | Tuomainen et al. ......... | 370/311 |
| 2003/0126486 | A1 * | 7/2003 | Bui ............................ | 713/320 |
| 2004/0002312 | A1 * | 1/2004 | Li et al. ..................... | 455/232.1 |
| 2004/0029620 | A1 * | 2/2004 | Karaoguz ................... | 455/574 |
| 2004/0224728 | A1 * | 11/2004 | Dacosta et al. ............. | 455/574 |
| 2005/0063348 | A1 * | 3/2005 | Donovan .................... | 370/338 |
| 2005/0190709 | A1 * | 9/2005 | Ferchland et al. .......... | 370/311 |
| 2005/0219120 | A1 * | 10/2005 | Chang .................. | 342/357.13 |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner*—Seema S Rao
*Assistant Examiner*—Khoa Huynh

(57) ABSTRACT

A network device includes a base band processor (BBP) receiver to detect a frame in a signal. A media access controller (MAC) receiver identifies a destination address in the frame. A power management module transitions the BBP receiver to an active mode based on an estimated energy level of the signal before transitioning the MAC receiver, a processor, a MAC transmitter, and a BBP transmitter to the active mode; transitions the MAC receiver to the active mode when the frame is present after transitioning the BBP receiver to the active mode and before transitioning the processor, the MAC transmitter, and the BBP transmitter to the active mode; and transitions the processor to the active mode based on the destination address after transitioning the BBP receiver and the MAC receiver to the active mode and before transitioning the MAC transmitter and the BBP transmitter to the active mode.

22 Claims, 27 Drawing Sheets

U.S. PATENT DOCUMENTS

2005/0249137 A1* 11/2005 Todd et al. .................. 370/311
2005/0250456 A1* 11/2005 Motohashi ................... 455/92

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

802.11n; IEEE P802.11-04/0889r6; Wireless LANs, TGn Sync Proposal Technical Specification; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

* cited by examiner

WIRELESS LAN POWER SAVINGS

CROSS-REFERENCE TO RELATED APPLICATIONS

This application claims the benefit of U.S. Provisional Application No. 60/759,474, filed on Jan. 17, 2006, and U.S. Provisional Application No. 60/685,468, filed on May 26, 2005. The disclosure of the above applications are incorporated herein by reference in their entirety.

FIELD OF THE INVENTION

The present invention relates to wireless networks, and more particularly to reducing power consumption of wireless network devices.

BACKGROUND OF THE INVENTION

IEEE defined several different standards for configuring wireless networks and devices. For example, 802.11, 802.11 (a), 802.11(b), 802.11(g), 802.11(h), 802.11(n), 802.16, and 802.20. According to these standards, wireless network devices may be operated in either an infrastructure mode or an ad-hoc mode.

In the infrastructure mode, the wireless network devices or client stations communicate with each other through an access point. In the ad-hoc mode, the wireless network devices communicate directly with each other and do not employ an access point. The term client station or mobile station may not necessarily mean that a wireless network device is actually mobile. For example, a desktop computer that is not mobile may incorporate a wireless network device and operate as a mobile station or client station.

A wireless network that operates in the infrastructure mode includes an access point (AP) and at least one client station that communicates with the AP. Since the client stations are often battery powered, it is important to minimize power consumption to preserve battery life. Therefore, some client stations implement a low power mode and an active, or "awake," mode. During the active mode, the client station transmits and/or receives data. During the low power mode, the client station shuts down components and/or alters operation to conserve power. Usually, the client station is not able to transmit or receive data during the lower power mode.

A power management device controls and selects different operating modes of the client stations. During operation, the power management device instructs some of the modules to transition to a low power mode to conserve power. Additional information may be found in U.S. patent application Ser. No. 10/650,887, filed on Aug. 28, 2003, Ser. No. 10/665,252, filed on Sep. 19, 2003, and Ser. No. 11/070,481 filed on Mar. 2, 2005, which are hereby incorporated by reference in their entirety.

Referring now to FIG. 1, a first wireless network 10 is illustrated in an infrastructure mode. The first wireless network 10 includes one or more client stations 12 and one or more access points (AP) 14. The client station 12 and the AP 14 transmit and receive wireless signals 16. The AP 14 is a node in a network 18. The network 18 may be a local area network (LAN), a wide area network (WAN), or another network configuration. The network 18 may include other nodes such as a server 20 and may be connected to a distributed communications system 22 such as the Internet.

The client station 12 does not continuously transmit data to or receive data from the AP 14. Therefore, the client station 12 implements a power savings mode when the client station 12 and the AP 14 do not have data to exchange. Data commonly remains intact in a network for a predetermined amount of time before it is dropped. The client station 12 informs the AP 14 when the client station 12 is entering a low power mode (and will not be capable of receiving data for a predetermined period). After notifying the AP 14, the client station 12 transitions to the low power mode. During the low power period, the AP 14 buffers data in memory 15 that is intended to be transmitted to the client station 12. Following the low power period, the client station 12 powers up and receives beacon transmissions from the AP 14. If the beacon transmissions indicate that the AP 14 has data for the client station 12, or the host processor or the client station 12 indicates it has data to transmit, the client station 12 remains active. Otherwise, the client station 12 enters the low power mode again.

Before the AP 14 sends out a beacon transmission, the AP 14 determines whether other devices are currently transmitting data so that other devices are able to use the network. The AP 14 transmits a beacon at a target beacon transmission time (TBTT). The client station 12 transitions to the active mode prior to a beacon transmission to queue frames to transmit to the AP 14 in a buffer. Following a beacon transmission, the AP 14 may transmit multicast or broadcast frames to one or more client stations 12 in a deterministic order. To minimize collisions that may occur when one or more client stations 12 simultaneously attempt to transmit data to the AP 14, each station 12 may wait for a random delay prior to a transmission. The random delay, commonly referred to as backoff, reduces the chance of multiple station transmissions occurring simultaneously.

Referring now to FIG. 2, a second wireless network 24 operates in an ad-hoc mode. The second wireless network 24 includes multiple client stations 26-1, 26-2, and 26-3 that transmit and receive wireless signals 28. The client stations 26-1, 26-2, and 26-3 collectively form a LAN and communicate directly with each other. The client stations 26-1, 26-2, and 26-3 are not necessarily connected to another network. The client stations 26-1, 26-2, and 26-3 do not continuously transmit data to and receive data from each other. The client stations 26 implement a power savings mode when one of the client stations 26-1 does not have data to exchange with the other client stations 26-2 and 26-3.

The client stations 26-1, 26-2, and 26-3 periodically transition to the active mode prior to the TBTT and generate a random number. The client station with the smallest random number transmits the beacon to the other client stations. Following the beacon, the client stations 26-1, 26-2, 26-3 may transmit an announcement traffic indication messages (ATIM) frame during a predefined ATIM window to notify other client stations of any buffered data waiting at the client station. For example, if client station 26-1 has buffered data intended for station 26-2, station 26-1 will transmit an ATIM frame subsequent to the beacon to inform station 26-2 of the buffered data. Once station 26-2 acknowledges the ATIM frame, station 26-1 transmits the buffered data to station 26-2.

FIG. 3 depicts a typical system on chip (SOC) circuit 40 that can be used to implement a wireless Ethernet network device, that is, a client station and/or an AP. The SOC 40 generally includes one or more processors 42; a medium access controller (MAC) device 44; a base band processor (BBP) 46; and a host interface. Additionally, the SOC 40 may include a radio frequency (RF) transceiver 48 or the transceiver may be located externally.

SUMMARY OF THE INVENTION

A wireless network device includes a base band processor (BBP), a media access controller (MAC), a processor that communicates with the MAC, and a power management module. The BBP determines whether a signal includes a frame. The MAC communicates with the BBP and identifies a destination address in the frame. The power management module selectively and sequentially transitions the BBP to an active mode based on an estimated energy of the signal, the MAC to the active mode when the frame is present, and the processor to the active mode based on the destination address.

In other features, the wireless network device includes a radio frequency (RF) receiver. The power management module transitions the RF receiver to an active mode based on a target beacon transmission time. The RF receiver receives the signal, determines an energy level of the signal, and communicates the signal to the BBP.

In other features, the power management module transitions a BBP receiver of the BBP to the active mode when the energy level is greater than a predetermined threshold. The power management module transitions a MAC receiver of the MAC to the active mode when the signal includes the frame. The power management module transitions the processor to the active mode when the destination address matches a predetermined address.

In other features, the power management module transitions the RF receiver to an inactive mode when the energy level is less than a predetermined level. The power management module transitions the BBP receiver and the RF receiver to the inactive mode when the signal does not include the frame. In other features, the power management module transitions the MAC receiver, the BBP receiver, and the RF receiver to the inactive mode when the destination address does not match a predetermined address.

In other features, the power management module transitions a MAC transmitter of the MAC to the active mode when the processor transitions to the active mode. The power management module transitions a BBP transmitter of the BBP to the active mode when the MAC transmitter transitions to the active mode.

In still other features, the power management module includes an RF transmitter. The RF transmitter transmits an RF signal. The power management module transitions the RF transmitter to the active mode when the MAC transmitter transitions to the active mode.

A method of powering up a network device includes estimating an energy level of a signal, determining whether the signal includes a frame, and identifying a destination address in the frame. The method selectively and sequentially transitions a base band processor (BBP) to an active mode based on the energy level, a media access controller (MAC) to the active mode when the frame is present, and a processor to the active mode based on the destination address.

In other features, the method transitions a radio frequency (RF) receiver to an active mode based on a target beacon transmission time. The method transitions a BBP receiver of the BBP to the active mode when the energy level is greater than a predetermined energy threshold. The method transitions a MAC receiver of the MAC to the active mode when the signal includes the frame. The method transitions the processor to the active mode when the destination address matches a predetermined address.

In other features, the method transitions the RF receiver to an inactive mode when the energy level is less than a predetermined threshold. The method transitions the BBP receiver and the RF receiver to the inactive mode when the signal does not include the frame. The method transitions the MAC receiver, the BBP receiver, and the RF receiver to the inactive mode when the destination address does not match a predetermined address.

In still other features, the method transitions a MAC transmitter of the MAC to the active mode when the processor transitions to the active mode. The method transitions a BBP transmitter of the BBP to the active mode when the MAC transmitter transitions to the active mode. The method transitions a RF transmitter to the active mode when the BBP transmitter transitions to the active mode.

A wireless network device includes base band processing (BBP) means for determining whether a signal includes a frame. The wireless network includes media access controller (MAC) means for identifying a destination address in the frame. The wireless network includes processor means for communicating with the MAC. The wireless network includes power management means for selectively and sequentially transitioning the BBP means to an active mode based on an estimated energy of the signal, the MAC means to the active mode when the frame is present, and processor means based on the destination address.

In other features, the wireless network device includes radio frequency (RF) receiver means for receiving the signal, for communicating the signal to the BBP means, and for determining the energy level. The wireless network device includes BBP receiver means for receiving the signal from the RF receiver means. The wireless network device includes MAC receiver means for receiving the frame.

In other features, the power management means transitions the RF receiver means to the active mode based on a target beacon transmission time. The power management means transitions the BBP receiver means to the active mode when the energy level is greater than a predetermined threshold. The power management means transitions the MAC receiver means to the active mode when the signal includes the frame. The power management module transitions the processor means to the active mode when the destination address matches a predetermined address.

In other features, the power management means transitions the RF receiver means to an inactive mode when the energy level is less than a predetermined level. The power management means transitions the BBP receiver means and the RF receiver means to the inactive mode when the signal does not include the frame. The power management means transitions the MAC receiver means, the BBP receiver means, and the RF receiver means to the inactive mode when the destination address does not match a predetermined address.

In other features, the wireless network device includes MAC transmitter means for transmitting data. The wireless network device includes BBP transmitter means for transmitting data. The wireless network device includes RF transmitter means for transmitting an RF signal.

In still other features, the power management means transitions the MAC transmitter means to the active mode when the processor means transitions to the active mode. The power management means transitions the BBP transmitter means to the active mode when the MAC transmitter means transitions to the active mode.

A computer program stored on a computer medium and executed by a processor for a wireless network device includes estimating an energy level of a signal, determining whether the signal includes a frame, and identifying a destination address in the frame. The computer program selectively and sequentially transitions a base band processor (BBP) to an active mode based on the energy level, a media access controller (MAC) to the active mode when the frame is present, and a processor to the active mode based on the destination address.

In other features, the computer program transitions a radio frequency (RF) receiver to an active mode based on a target beacon transmission time. The computer program transitions a BBP receiver of the BBP to the active mode when the energy level is greater than a predetermined energy threshold. The computer program transitions a MAC receiver of the MAC to the active mode when the signal includes the frame. The computer program transitions the processor to the active mode when the destination address matches a predetermined address.

In other features, the computer program transitions the RF receiver to an inactive mode when the energy level is less than a predetermined threshold. The computer program transitions the BBP receiver and the RF receiver to the inactive mode when the signal does not include the frame. The computer program transitions the MAC receiver, the BBP receiver, and the RF receiver to the inactive mode when the destination address does not match a predetermined address.

In still other features, the computer program transitions a MAC transmitter of the MAC to the active mode when the processor transitions to the active mode. The computer program transitions a BBP transmitter of the BBP to the active mode when the MAC transmitter transitions to the active mode. The computer program transitions a RF transmitter to the active mode when the BBP transmitter transitions to the active mode.

A host control module for an access point includes a beacon control module and a link control module. The beacon control module controls transmission of a first periodic beacon having a first period. The beacon control module controls transmission of a second periodic beacon having a second period that is longer than the first period. The link control module establishes a link with at least one client station based on data in at least one of the second beacons. After the link is established, the link control module communicates with the at least one client station based on data in at least one of the first beacons.

In other features, an access point (AP) includes the host control module and further includes a radio frequency transmitter that transmits the first and second beacons. The second beacon is transmitted at a target beacon transmission time. The first beacon includes a header, a timestamp, and a traffic indication map.

In other features, a wireless network includes the AP and further including a client station. The client station periodically transitions to an active mode in sync with the first period to receive the first beacon after the client station establishes a link with the wireless network.

In still other features, a wireless network including the AP and further including a client station. The client station includes a radio frequency (RF) transceiver and a client control module. The RF transceiver transmits and receives RF signals. The client control module communicates with the RF transceiver and selectively receives the first and second beacon. The client control module transitions the client station to an active mode to receive data in the second beacon, establishes a link with the AP based on data in the second beacon. The client control module transitions the client station to the active mode to receive data in the first beacon after the link is established.

A control module for a client station includes a receiver and a power management module. The receiver selectively receives a first periodic beacon having a first period. The receiver selectively receives a second periodic beacon having a second period that is longer than the first period. The power management module transitions the client station to an active mode to receive data in at least one of the second beacons and establishes a link with an access point based on data in the at least one the second beacons. The power management module transitions the client station to the active mode to receive data in at least one of the first beacons after the link is established.

In other features, a client station includes the control module and further includes a radio frequency (RF) transceiver. The RF transceiver receives the first and second beacons.

In other features, a wireless network includes the client station and further includes an access point (AP). The AP includes an RF transmitter, a beacon control module, and a link control module. The RF transmitter transmits RF signals. The beacon control module communicates with the RF transmitter and controls transmission of the first and second beacon. The link control module establishes a link with at least one client station based on data in the second beacon. The link control module communicates with the at least one client station based on data in the first beacon after the link is established.

In still other features, the AP transmits the second beacon at a target beacon transmission time. The first beacon includes a header, a timestamp, and a traffic indication map.

A method for operating a network device includes periodically transmitting a first beacon for a first period. The method includes periodically transmitting a second beacon for a second period that is longer than the first period. The method includes establishing a link with at least one client station based on data in at least one of the second beacons. The method includes communicating with the at least one other client station based on data in at least one of the first beacons after the link is established.

In other features, the method includes transmitting the first and second beacons with a radio frequency (RF) transmitter. The method includes transmitting the second beacon at a target beacon transmission time. The first beacon includes a header, a timestamp, and a traffic identification map in the first beacon.

In other features, the method further includes periodically transitioning the client station to an active mode in sync with the first period to receive the first beacon after the client station establishes a link with the AP.

In still other features, the method includes selectively receiving the first and the second beacon. The method includes transitioning the client station to an active mode to receive data in the second beacon. The method includes establishing a link with an access point based on the data in the second beacon. The method includes transitioning the client station to the active mode to receive the first beacon after the link is established.

A method for operating a network device includes selectively receiving a first periodic beacon having a first period. The method includes selectively receiving a second periodic beacon having a second period that is longer than the first period. The method includes transitioning the client station to an active mode to receive data in at least one of the second beacons. The method includes establishing a link with an access point based on the data in the at least one of the second beacons. The method includes transitioning the client station to the active mode to receive data in at least one of the first beacons after the link is established.

In other features, the method includes receiving the first and second beacons with a radio frequency (RF) transceiver.

In other features, the method includes transmitting the first and second beacon. The method includes establishing a link with at least one client station based on data in the second beacon. The method includes communicating with the at least one client station based on data in the first beacon after the link is established.

In still other features, the method includes transmitting the second beacon at a target beacon transmission time. The first beacon includes a header, a timestamp, and a traffic identification map.

A host control module for an access point includes beacon control means for controlling transmission of a first periodic beacon having a first period and a second periodic beacon having a second period that is longer than the first period. The host control module includes link control means for establishing a link with at least one client station based on data in at least one of the second beacons, wherein the host control module communicates with the at least one client station based on data in at least one of the first beacons after the link is established.

In other features, an access point (AP) includes the host control module and further includes radio frequency (RF) transmitter means for transmitting the first and second beacons. The RF transmitter means transmits the second beacon at a target beacon transmission time. The first beacon includes a header, a timestamp, and a traffic identification map.

In other features, a wireless network includes the AP and further includes client station means for periodically transitioning to an active mode in sync with the first period to receive the first beacon after the client station means establishes a link to the wireless network.

In still other features, a wireless network includes the AP and further includes a client station. The client station includes radio frequency (RF) transceiver means for transmitting and receiving RF signals. The client station includes client control means for communicating with the RF transceiver and for selectively receiving the first beacon and the second beacon. The client control means transitions the client station to an active mode to receive data in the second beacon, establishes a link with an access point based on the data in the second beacon and thereafter transitions to the active mode to receive data in the first beacon.

A client control module for a client station includes receiver means for selectively receiving a first periodic beacon having a first period and a second periodic beacon having a second period that is longer than the first period. The client control module includes power management means for transitioning the client control module to an active mode to receive data in at least one of the second beacons and for establishing a link with an access point based on the data in the at least one of the second beacons. The power management means transitions the client station to the active mode to receive data in at least one of the first beacons after the link is established.

In other features, a client station includes the client control module and further includes radio frequency receiver means for receiving the first and second beacons.

In other features, a wireless network includes the client station further includes an access point (AP). The AP includes radio frequency (RF) transmitter means for transmitting RF signals. The AP includes beacon control means for communicating with the RF transmitter means and for controlling transmission of the first beacon and the second beacon. The AP includes link control means for establishing a link with at least one client station based on data in the second beacon and thereafter for communicating with the at least one client station based on data in the first beacon.

In still other features, the wireless network of claim 31 wherein the AP transmits the second beacon at a target beacon transmission time. The first beacon includes a header, a timestamp, and a traffic identification map.

A computer program stored on a computer medium and executed by a processor for controlling an access point includes periodically transmitting a first beacon for a first period. The computer program includes periodically transmitting a second beacon for a second period that is longer than the first period. The computer program includes establishing a link with at least one client station based on data in at least one of the second beacons. The computer program includes communicating with the at least one other client station based on data in at least one of the first beacons after the link is established.

In other features the computer program includes transmitting the first and second beacons with a radio frequency (RF) transmitter. The computer program includes transmitting the second beacon at a target beacon transmission time. The computer program includes including a header, a timestamp, and a traffic identification map in the first beacon.

A computer program stored on a computer medium and executed by a processor for a client station includes selectively receiving a first periodic beacon having a first period. The computer program includes selectively receiving a second periodic beacon having a second period that is longer than the first period. The computer program includes transitioning the client station to an active mode to receive data in at least one of the second beacons. The computer program includes establishing a link with an access point based on the data in the at least one of the second beacons. The computer program includes transitioning the client station to the active mode to receive data in at least one of the first beacons after the link is established.

In other features, the computer program includes receiving the first and second beacons with a radio frequency (RF) transceiver.

A control module for an access point includes memory, a receiver, and a filter module. The memory buffers at least one of unicast, broadcast, and multicast data for a client station. The receiver receives a data filter parameter from the client station. The filter module filters a predetermined type of data based on the data filter parameter. The filter module selectively adjusts a traffic indication map (TIM) that indicates whether a client station has buffered data based on the data that is buffered in the memory and the data filter parameter.

In other features, an access point (AP) includes the control module of and further includes a radio frequency (RF) transceiver. The RF transceiver receives data packets containing the data filter parameter from the client station. The RF transceiver communicates the data filter parameter to the receiver. The RF transceiver periodically transmits a beacon containing the TIM.

In other features, a wireless network includes the AP and further includes a client station that transmits the data packets containing the data filter parameter to the AP prior to entering a power save mode.

In still other features, the filter module selectively changes a bit in the TIM that corresponds to the client station when the data that is buffered in the memory is of the predetermined type. The data filter parameter set by the client station selectively requires the AP to send a response to a sending client station. The filter module selectively deletes the data buffered in the memory when the data is of the predetermined type.

A control module for a client station includes a receiver, a power management module and a client filter module. The receiver periodically receives a traffic indication map (TIM) that indicates whether the client station has data buffered at a host. The power management module periodically transitions the client station to an active mode. The power management module transitions to an inactive mode when the TIM indicates that the client station does not have data buffered at the host. The client filter module generates a data filter parameter to filter a predetermined data type prior to transitioning to a power save mode. The client filter module transmits the data filter parameter to the host prior to transitioning to the power save mode.

In other features, a client station includes the client control module of and further includes a radio frequency (RF) transceiver. The RF transceiver transmits the data filter parameter and receives a beacon containing the TIM.

In other features, a wireless network includes the client station further includes an access point (AP). The AP includes an AP RF transceiver that transmits the beacon and that receives the data filter parameter. The AP includes memory that buffers data for the client station. The AP includes an AP control module. The AP control module buffers at least one of unicast, broadcast, and multicast data for the client station in the memory. The AP control module filters the predetermined data type based on the data filter parameter. The AP control module selectively adjusts the TIM based on the data that is buffered in the memory and the data filter parameter.

In still other features, the AP control module selectively changes a bit in the TIM that corresponds to the client station when the data buffered in the memory is of the predetermined data type. The AP to send a response to a sending client station. The AP control module selectively deletes the data buffered in the memory when the data is of the predetermined type based on the data filter parameter.

A method for operating a network device includes buffering at least one of unicast, multicast, and broadcast data in memory for a client station. The method includes receiving a data filter parameter from the client station. The method includes filtering a predetermined type of data based on the data filter parameter. The method includes selectively adjusting a traffic indication map (TIM) that indicates whether a client station has buffered data based on the data that is buffered in the memory and the data filter parameter.

In other features, the method includes receiving data packets containing the data filter parameter with an RF transceiver. The method includes periodically transmitting a beacon that contains the TIM with the RF transceiver.

In other features, the method includes transmitting the RF signal containing the data filter parameter to the RF transceiver prior to entering a power save mode.

In still other features, the method further includes selectively changing a bit in the TIM that corresponds to the client station when the data that is buffered in the memory is of the predetermined type. The data filter parameter set by the client station selectively requires the AP to send a response to a sending client. The method includes selectively deleting the data buffered in the memory when the data is of the predetermined type.

A method for operating a network device includes periodically transitioning a client station to an active mode. The method includes periodically receiving a traffic indication map (TIM) that indicates whether the client station has data buffered at a host. The method includes transitioning to an inactive mode when the TIM indicates that the client station does not have data buffered at the host. The method includes generating a data filter parameter to filter a predetermined data type prior to transitioning to a power save mode. The method includes transmitting the filter parameter to the host prior to transitioning to the power save mode.

In other features, the method includes transmitting the data filter parameter and receiving a beacon containing the TIM with a radio frequency (RF) transceiver.

In other features, the method includes transmitting the beacon with a host RF transceiver. The method includes receiving the data filter parameter with the host RF transceiver. The method includes buffering at least one of unicast, broadcast, and multicast data for the client station in memory. The method includes filtering the predetermined data type based on the data filter parameter. The method includes selectively adjusting the TIM based on the data that is buffered in the memory and the data filter parameter.

In still other features, the method further includes selectively changing a bit in the TIM that corresponds to the client station when the data buffered in the memory is of the predetermined data type. The data filter parameter that is set by the client station requires the AP to send a response to a sending client station. The method includes selectively deleting the data buffered in the memory when the data is of the predetermined type based on the data filter parameter.

A control module for an access point includes memory means for buffering at least on of unicast, broadcast, and multicast data for a client station. The control module includes receiver means for receiving a data filter parameter from the client station. The control module includes filter means for filtering a predetermined type of data based on the data filter parameter and for selectively adjusting a traffic indication map (TIM) that indicates whether a client station has buffered data based on the data that is buffered in the memory means and the data filter parameter.

In other features, an access point (AP) includes the control module and further includes radio frequency transceiver means for receiving data packets containing the data filter parameter from the client station, for communicating the data filter to the receiver means, and for periodically transmitting a beacon containing the TIM.

In other features, a wireless network includes the AP and further includes client station means for transmitting the data packets containing the data filter parameter to the AP prior to entering a power save mode.

In still other features, the filter means selectively changes a bit in the TIM that corresponds to the client station when the data that is buffered in the memory means is of the predetermined type. The data filter parameter set by the client station means selectively requires the AP to send a response to a sending client station. The filter means selectively deletes the data buffered in the memory means when the data is of the predetermined type.

A control module for a client station includes receiver means for periodically receiving a traffic indication map (TIM) that indicates whether the client station has data buffered at a host. The control module includes power management means for periodically transitioning the client station to an active mode and for transitioning to an inactive mode when the TIM indicates that the client station does not have data buffered at the host. The control module includes client filter means for generating a data filter parameter to filter a predetermined data type prior to transitioning to a power save mode and for transmitting the data filter parameter to the host prior to transitioning to the power save mode.

In other features, a client station includes the control module and further includes radio frequency transceiver means for transmitting the data filter parameter and for receiving a beacon containing the TIM.

In other features, a wireless network includes the client station and further includes an access point (AP). The AP includes AP RF transceiver means for transmitting the beacon and for receiving the data filter parameter. The AP includes memory means for buffering at least one of unicast, broadcast, and multicast data for the client station. The AP includes AP control means for filtering the predetermined data type based on the data filter parameter and for selectively adjusting the TIM based on the data that is buffered in the memory means and the data filter parameter.

In still other features, the AP control module selectively changes a bit in the TIM that corresponds to the client station when the data buffered in the memory means is of the predetermined data type. The data filter parameter set by the client station selectively requires the AP to send a response to a sending client station. The AP control module selectively deletes the data buffered in the memory means when the data is of the predetermined type based on the data filter parameter.

A computer program stored on a computer medium and executed by a processor for an access point includes buffering at least one of unicast, multicast, and broadcast data in memory for a client station. The computer program includes receiving a data filter parameter from the client station. The computer program includes filtering a predetermined type of data based on the data filter parameter. The computer program includes selectively adjusting a traffic indication map (TIM) that indicates whether a client station has buffered data based on the data that is buffered in the memory and the data filter parameter.

In other features, the computer program includes receiving a radio frequency (RF) signal including the data filter parameter with an RF transceiver. The computer program includes periodically transmitting a beacon that includes the TIM with the RF transceiver.

In still other features, the data filter parameter set by the client station selectively requires the AP to send a response to a sending client. The computer includes selectively deleting the data buffered in the memory when the data is of the predetermined type.

A computer program stored on a computer medium and executed by a processor for a client station includes periodically transitioning the client station to an active mode. The computer program includes periodically receiving a traffic indication map (TIM) that indicates whether the client station has data buffered at a host. The computer program includes transitioning to an inactive mode when the TIM indicates that the client station does not have data buffered at the host. The computer program includes generating a data filter parameter to filter a predetermined data type prior to transitioning to a power save mode. The computer program includes transmitting the filter parameter to the host prior to transitioning to the power save mode.

In still other features, the computer program includes transmitting the data filter parameter and receiving a beacon containing the TIM with a radio frequency (RF) transceiver.

A control module for a client station includes a listen interval module and a power management module. The listen interval module negotiates a beacon transmission schedule with at least one other client station that includes a beacon transmission time and an interval between the beacon transmission time. The listen interval module determines a first listen interval for the client station and receives a second listen interval from the at least one other client station. The power management module periodically transitions the client station to an active mode based on the first listen interval. The power management module selectively transitions the client station to the active mode based on the second listen interval to communicate directly with the at least one other client station.

In other features, the control module further includes a radio frequency (RF) transceiver that transmits and receives data packets directly to and from the at least one other client station and that periodically one of transmits and receives a beacon. The RF transceiver transmits at least one data packet that includes the first listen interval to the at least one other client station prior to transitioning to a power save mode. The RF transceiver receives at least one data packet that includes the second listen interval from the at least one other client station prior to the at least one other client station transitioning to a power save mode.

In other features the listen interval module determines a beacon number based on the beacon transmission time and the interval. The power management module transitions the client station to the active mode when the beacon number is a multiple of the first listen interval. The power management module transitions the client station to the active mode when the beacon number is a multiple of the second listen interval.

In other features, the control module further includes a contention avoidance (CA) module. The CA module periodically transitions the client station to the active mode for a predetermined period. The CA module selectively transmits at least one data packet that includes an announcement traffic indication message (ATIM). The predetermined period is based on a single ATIM transmission.

In still other features, the CA module negotiates a station identifier for each client station in an associated network with the other client stations. The CA module determines a beacon number based on the beacon transmission time and the interval. The CA module determines a remainder of the beacon number divided by a total number of client stations in the associated network. The CA module transmits the ATIM when the remainder matches the station identifier.

A control module for a client station includes a power management module and a contention avoidance (CA) module. The power management module periodically transitions the client station to an active mode for a predetermined period. The CA module negotiates a beacon transmission schedule with at least one other client station that includes a beacon transmission time and an interval between the beacon transmission time. The CA module negotiates a first transmission schedule for the client station and a second transmission schedule for the at least one other client station. The CA module either transmits an announcement traffic indication message (ATIM) that indicates whether the client station has data to transmit directly to the at least one other client station during the predetermined period based on the first transmission schedule or receives an ATIM directly from the at least one other client station during the predetermined period based on the second transmission schedule.

In other features, the control module further includes a radio frequency (RF) transceiver that transmits and receives data packets directly to and from the at least one other client station and that periodically one of transmits and receives a beacon. The predetermined period is based on a time required to transmit a single ATIM.

In other features, the CA module negotiates a station identifier for each client station in an associated network with the each client station. The CA module determines a beacon number based on the beacon transmission time and the interval. The CA module determines a remainder of the beacon number divided by a total number of client stations in the associated network. The CA module transmits the ATIM when the remainder matches the station identifier.

In other features, the control module further includes a listen interval (LI) module. The LI module determines a first listen interval for the client station. The LI module receives a second listen interval from the at least one other client station. The LI module periodically transitions the client station to the active mode based on the first listen interval. The LI module selectively transitions the client station to the active mode based on the second listen interval.

In other features, the RF transceiver transmits at least one data packet that includes the first listen interval to the at least one other client station prior to transitioning to a power save mode. The RF transceiver receives at least one data packet that includes the second listen interval from the at least one other client station prior to the at least one other client station transitioning to a power save mode.

In still other features, the LI module determines a beacon number based on the beacon transmission time and the interval. The LI module transitions the client station to the active mode when the beacon number is a multiple of the first listen interval. The LI module determines a beacon number based on the beacon transmission time and the interval. The LI module transitions the client station to the active mode when the beacon number is a multiple of the second listen interval.

A method for controlling a client station including negotiating a beacon transmission schedule with at least one other client station that includes a beacon transmission time and an interval between the beacon transmission time. The method includes determining a first listen interval for the client station. The method includes receiving a second listen interval from at least one other client station. The method includes periodically transitioning the client station to an active mode based on the listen interval. The method includes selectively transitioning the client station to the active mode based on the second listen interval to communicate directly with the at least one other client station.

In other features, the method includes transmitting and receiving data packets directly to and from the at least on other client station and periodically one of transmitting and receiving a beacon with a radio frequency (RF) transceiver.

In other features, the method includes transmitting at least one data packet that includes the first listen interval to the at least one other client station prior to transitioning to a power save mode. The method includes receiving at least one data packet that includes the second listen interval from the at least one other client station prior to the at least one other client station transitioning to a power save mode.

In other features, the method includes determining a beacon number based on the beacon transmission time and the interval. The method includes transitioning the client station to the active mode when the beacon number is a multiple of the first listen interval. The method includes transitioning the client station to the active mode when the beacon number is a multiple of the second listen interval.

In other features, the method includes periodically transitioning the client station to the active mode for a predetermined period. The method includes selectively transmitting at least one data packet that includes an announcement traffic indication message (ATIM), wherein the predetermined period is based on a single ATIM transmission.

In still other features, the method includes negotiating a station identifier for each client station in an associated network with the client station. The method includes determining a beacon number based on the beacon transmission time and the interval. The method includes determining a remainder of the beacon number divided by a total number of client stations in the associated network. The method includes transmitting the ATIM when the remainder matches the station identifier.

A method for controlling a client station includes periodically transitioning the client station to an active mode for a predetermined period. The method includes negotiating a beacon transmission schedule with at least one other client station that includes a beacon transmission time and an interval between the beacon transmission time. The method includes negotiating a first transmission schedule for the client station and a second transmission schedule for the at least one other client station. The method includes either transmitting an announcement traffic indication message (ATIM) that indicates whether the client station has data to transmit directly to the at least one other client station during the predetermined period based on the first transmission schedule or receiving an ATIM directly from the at least one other client station during the predetermined period based on the second transmission schedule.

In other features, the method includes transmitting and receiving data packets directly to and from the at least one other client station with a radio frequency (RF) transceiver and periodically one of transmitting and receiving a beacon with the RF transceiver. The predetermined period is based on a time required to transmit a single ATIM.

In other features, the method includes negotiating a station identifier for each client station in an associated network with the each client station. The method includes determining a beacon number based on the beacon transmission time and the interval. The method includes determining a remainder of the beacon number divided by a total number of client stations in the associated network. The method includes transmitting the ATIM when the remainder matches the station identifier.

In other features, the method includes determining a first listen interval for the client station. The method includes receiving a second listen interval from the at least on other client station. The method includes periodically transitioning the client station to the active mode based on the first listen interval. The method includes selectively transitioning the client station to the active mode based on the second listen interval.

In other features, the method includes transmitting at least one data packet with the RF transceiver that include the first listen interval to the at least one other client station prior to transitioning to a power save mode. The method includes receiving at least one data packet with the RF transceiver that includes the second listen interval from the at least one other client station prior to the at least one other client station transitioning to a power save mode.

In still other features, the method includes determining a beacon number based on the beacon transmission time and the interval. The method includes transitioning the client station to the active mode when the beacon number is a multiple of the second listen interval. The method includes determining beacon number based on the beacon transmission time and the interval. The method includes transitioning the client station to the active mode when the beacon number is a multiple of the second listen interval.

A control module for a client station includes listen interval means for negotiating a beacon transmission schedule with at least one other client station that includes a beacon transmission time and an interval between the beacon transmission time, for determining a first listen interval for the client station, and for receiving a second listen interval from the at least one other client station. The control module includes power management means for periodically transitioning the client station to an active mode based on the first listen interval and for selectively transitioning the client station to the active mode based on the second listen interval to communicate directly with the at least one other client station.

In other features, the control module includes radio frequency (RF) transceiver means that transmits and receives data packets directly to and from the at least one other client station and that periodically one of transmits and receives a beacon. The RF transceiver means transmits at least one data packet that includes the first listen interval to the at least one other client station prior to transitioning to a power save mode. The RF transceiver means receives at least one data packet that includes the second listen interval from the at least one other client station prior to the at least one other client station transitioning to a power save mode.

In other features, the listen interval means determines a beacon number based on the beacon transmission time. The power management means transitions the client station to the active mode when the beacon number is a multiple of the first listen interval. The power management means transitions the client station to the active mode when the beacon number is a multiple of the second listen interval.

In other features, the control module includes contention avoidance (CA) means for periodically transitioning the client station to the active mode for a predetermined period and for selectively transmitting at least one data packet that includes an announcement traffic indication message (ATIM), wherein the predetermined period is based on a single ATIM transmission.

In still other features, the CA means negotiates a station identifier for each client station in an associated network with the other client stations. The CA means determines a beacon number based on the beacon transmission time and the interval. The CA means determines a remainder of the beacon number divided by a total number of client stations in the associated network. The CA means transmits the ATIM when the remainder matches the station identifier.

A control module for a client station includes power management means for periodically transitioning the client station to an active mode for a predetermined period. The control module includes contention avoidance (CA) means for negotiating a beacon transmission schedule with at least one other client station that includes a beacon transmission time and an interval between the beacon transmission time, for negotiating a first transmission schedule for the client station and a second transmission schedule for the at least one other client station, and for either transmitting an announcement traffic indication message (ATIM) that indicates whether the client station has data to transmit directly to the at least one other client station during the predetermined period based on the first transmission schedule or receiving an ATIM directly from the at least one other client station during the predetermined period based on the second transmission schedule.

In other features, the control module includes radio frequency (RF) transceiver means for transmitting and receiving data packets directly to and from the at least one other client station and that periodically one of transmits and receives a beacon. The predetermined period is based on a time required to transmit a single ATIM.

In other features, the CA means negotiates a station identifier for each client station in an associated network with the each client station. The CA means determines a beacon number based on the beacon transmission time and the interval. The CA means determines a remainder of the beacon number divided by a total number of client stations in the associated network. The CA means transmits the ATIM when the remainder matches the station identifier.

In other features, the control module includes listen interval (LI) means for determining a first listen interval for the client station, for receiving a second listen interval from the at least one other client station, for periodically transitioning the client station to the active mode based on the first listen interval, and for selectively transitioning the client station to the active mode based on the second listen interval.

In other features, the RF transceiver means transmits at least one data packet that includes the first listen interval to the at least one other client station prior to transitioning to a power save mode. The RF transceiver means receives at least one data packet that includes the second listen interval from the at least one other client station prior to the at least one other client station transitioning to a power save mode.

In other features, the LI means determines a beacon number based on the beacon transmission time and the interval. The LI means transitions the client station to the active mode when the beacon number is a multiple of the first listen interval. The LI means transitions the client station to the active mode when the beacon number is a multiple of the second listen interval.

A computer program stored on a computer medium and executed by a processor for a client station includes negotiating a beacon transmission schedule with at least one other client station that includes a beacon transmission time and an interval between the beacon transmission time. The computer program includes determining a first listen interval for the client station. The computer program includes receiving a second listen interval from at least one other client station. The computer program includes periodically transitioning the client station to an active mode based on the listen interval. The computer program includes selectively transitioning the client station to the active mode based on the second listen interval to communicate directly with the at least one other client station.

In other features, the computer program includes transmitting and receiving data packets directly to and from the at least on other client station and periodically one of transmitting and receiving a beacon with a radio frequency (RF) transceiver.

In other features, the computer program includes transmitting at least one data packet that includes the first listen interval to the at least one other client station prior to transitioning to a power save mode. The computer program includes receiving at least one data packet that includes the second listen interval from the at least one other client station prior to the at least one other client station transitioning to a power save mode.

In other features, the computer program includes determining a beacon number based on the beacon transmission time and the interval. The computer program includes transitioning the client station to the active mode when the beacon number is a multiple of the first listen interval. The computer program includes transitioning the client station to the active mode when the beacon number is a multiple of the second listen interval.

In other features, the computer program includes periodically transitioning the client station to the active mode for a predetermined period. The computer program includes selectively transmitting at least one data packet that includes an announcement traffic indication message (ATIM), wherein the predetermined period is based on a single ATIM transmission.

In still other features, the computer program includes negotiating a station identifier for each client station in an associated network with the client station. The computer program includes determining a beacon number based on the beacon transmission time and the interval. The computer program includes determining a remainder of the beacon number divided by a total number of client stations in the associated network. The computer program includes transmitting the ATIM when the remainder matches the station identifier.

A computer program stored on a computer medium and executed by a processor for controlling a client station includes periodically transitioning the client station to an active mode for a predetermined period. The computer program includes negotiating a beacon transmission schedule with at least one other client station that includes a beacon transmission time and an interval between the beacon transmission time. The computer program includes negotiating a first transmission schedule for the client station and a second transmission schedule for the at least one other client station. The computer program includes either transmitting an announcement traffic indication message (ATIM) that indicates whether the client station has data to transmit directly to the at least one other client station during the predetermined period based on the first transmission schedule or receiving an ATIM directly from the at least one other client station during the predetermined period based on the second transmission schedule.

In other features, the computer program includes transmitting and receiving data packets directly to and from the at least one other client station with a radio frequency (RF) transceiver and periodically one of transmitting and receiving a beacon with the RF transceiver. The predetermined period is based on a time required to transmit a single ATIM.

In other features, the computer program includes negotiating a station identifier for each client station in an associated network with the each client station. The computer program includes determining a beacon number based on the beacon transmission time and the interval. The computer program includes determining a remainder of the beacon number divided by a total number of client stations in the associated network. The computer program includes transmitting the ATIM when the remainder matches the station identifier.

In other features, the computer program includes determining a first listen interval for the client station. The computer program includes receiving a second listen interval from the at least on other client station. The computer program includes periodically transitioning the client station to the active mode based on the first listen interval. The computer program includes selectively transitioning the client station to the active mode based on the second listen interval.

In other features, the computer program includes transmitting at least one data packet with the RF transceiver that include the first listen interval to the at least one other client station prior to transitioning to a power save mode. The computer program includes receiving at least one data packet with the RF transceiver that includes the second listen interval from the at least one other client station prior to the at least one other client station transitioning to a power save mode.

In still other features, the computer program includes determining a beacon number based on the beacon transmission time and the interval. The computer program includes transitioning the client station to the active mode when the beacon number is a multiple of the second listen interval. The computer program includes transitioning the client station to the active mode when the beacon number is a multiple of the second listen interval.

A control module for a client station includes a power management module and a power save delivery (PSD) module. The power management module periodically transitions the client station to an active mode for a predetermined period based on a target beacon transmission time. The client station selectively transmits and receives data packets directly with at least one other client station during the predetermined period. The PSD module selectively negotiates an activation schedule with the at least one other client station that is independent of the target beacon transmission time. The power management module transitions the client station to the active mode based on the activation schedule after the PSD module negotiates the activation schedule.

In other features, the control module includes a radio frequency (RF) transceiver that transmits and receives data packets directly to and from the at least one other client station.

In other features, a wireless network includes the control module further includes a second client station. The second client station includes a second RF transceiver, a second power management module, and second PSD. The second RF transceiver transmits and receives data packets directly with the client station. The second power management module periodically transitions the second client station to an active mode for the predetermined period based on the target beacon transmission time. The second client station selectively transmits and receives data packets directly with the client station during the predetermined time. The second PSD module selectively negotiates the activation schedule with the client station. The second power management module transitions the second client station to the active mode based on the activation schedule after the second PSD module negotiates the activation schedule.

In still other features, the client station selectively transmits the data packets to the second client station based on the activation schedule. The second client station selectively transmits the data packets to the client station based on the activation schedule. The client station and the second client station receive data packets based on the activation schedule.

A method for operating a network device includes periodically transitioning a client station to an active mode for a predetermined period based on a target beacon transmission time. The method includes selectively transmitting and receiving data during the predetermined period directly with at least one other client station. The method includes selectively negotiating an activation schedule with the at least one other client station that is independent of the target beacon transmission time. The method includes transitioning the client station to the active mode based on the activation schedule after negotiating the activation schedule.

In other features, the method includes transmitting and receiving data packets directly to and from the at least one other client station with a radio frequency (RF) transceiver.

In other features, the control method includes periodically transitioning a second client station to an active mode for a predetermined period based on the target beacon transmission time. The method includes selectively transmitting and receiving data packets directly with the client station during the predetermined time. The method includes selectively negotiating the activation scheduled with the client station. The method includes transitioning the second client station to active mode based on the activation schedule after negotiating the activation schedule.

In still other features, the method includes selectively transmitting and receiving the data packets to the second client station based on the activation schedule. The second method includes selectively transmitting and receiving the data packets to the client station based on the activation schedule. The client station and the second client station receive packets based on the activation schedule.

A control module for a client station includes power management means for periodically transitioning the client station to an active mode for a predetermined period based on a target beacon transmission time, wherein the client station selectively transmits and receives data packets directly with at least one other client station during the predetermined period. The control module includes power save delivery (PSD) means for selectively negotiating an activation schedule with the at least one other client station that is independent of the target beacon transmission time. The power management means transitions the client station to the active mode based on the activation schedule after the PSD means negotiates the activation schedule.

In other features, the control module includes radio frequency (RF) transceiver means for transmitting and receiving data packets directly to and from the at least one other client station.

In other features, a wireless network includes the control module and further includes a second client station. The second client station includes second RF transceiver means for transmitting and receiving data packets directly with the client station. The second client station includes second power management means for periodically transitioning the second client station to an active mode for the predetermined period based on the target beacon transmission time, wherein the second client station selectively transmits and receives data packets directly with the client station during the predetermined time. The second client station includes second PSD means for selectively negotiating the activation schedule with the client station, wherein the second power management means transitions the second client station to the active mode based on the activation schedule after the second PSD means negotiates the activation schedule.

In still other features, the client station selectively transmits the data packets to the second client station based on the activation schedule. The second client station selectively transmits the data packets to the client station based on the activation schedule. The client station and the second client station receive data packets based on the activation schedule.

A computer program stored on a computer medium and executed by a processor for a client station includes periodically transitioning the client station to an active mode for a predetermined period based on a target beacon transmission time. The computer program includes selectively transmitting and receiving data during the predetermined period directly with at least one other client station. The computer program includes selectively negotiating an activation schedule with the at least one other client station that is independent of the target beacon transmission time. The computer program includes transitioning the client station to the active mode based on the activation schedule after negotiating the activation schedule.

In still other features, the computer program includes transmitting and receiving data packets directly to and from the at least one other client station with a radio frequency (RF) transceiver.

A client station includes a radio frequency (RF) transceiver and an off-channel (OC) management module. The RF transceiver transmits and receives data packets at a first frequency directly to and from other client stations. The RF transceiver selectively operates at one of the first frequency and a second frequency. The OC management module generates an off-channel announcement (OCA) message in at least one of the data packets that indicates an off-channel period that the RF transceiver will operate at the second frequency. The OC management module transitions the RF transceiver to the second frequency after the OCA message is generated.

In other features, the OC management module generates a cancel off-channel announcement message in at least one of the data packets when the RF transceiver transitions from the second frequency to the first frequency before the off-channel period has elapsed.

In other features, a wireless network includes the client station and further includes a second client station. The second client station operates at the first frequency. The second client station periodically transitions to an active mode for a predetermined period. The second client station transmits and receives the data packets directly with the RF transceiver during the predetermined period.

In still other features, the RF transceiver transmits the OCA message in the at least one of the data packets during the predetermined period. The RF transceiver transmits a cancel off-channel announcement message in at least one of the data packets during the predetermined period. The second client station selectively transmits at least one of the data packets to the client station after the off-channel period.

A method for operating a network device includes transmitting and receiving data packets at a first frequency directly to and from other client stations with a radio frequency (RF) transceiver. The method includes selectively operating the RF transceiver at one of the first frequency and a second frequency. The method includes generating an off-channel announcement (OCA) message in at least one of the data packets that indicates an off-channel period that the RF transceiver will operate at the second frequency. The includes transitioning the RF transceiver to the second frequency after the OCA message is generated.

In other features, the method includes generating a cancel off-channel announcement message in at least one of the data packets when the RF transceiver transitions from the second frequency to the first frequency before the off-channel period has elapsed.

In other features, the method includes operating a second client station at the first frequency. The method includes periodically transitioning the second client station to an active mode for a predetermined period. The method includes transmitting and receiving the data packets directly with the RF transceiver during the predetermined period.

In still other features, the RF transceiver transmits the OCA message in the at least one of the data packets during the predetermined period. The method includes transmitting a cancel off-channel announcement message in at least one of the data packets during the predetermined period. The second client station selectively transmits at least one of the data packets to the client station after the off-channel period.

A client station includes radio frequency (RF) transceiver means for transmitting and receiving data packets at a first frequency directly to and from other client stations and for selectively operating at one of the first frequency and a second frequency. The client station includes off-channel (OC) management means for generating an off-channel announcement (OCA) message in at least one of the data packets that indicates an off-channel period that the RF transceiver means will operate at the second frequency and for transitioning the RF transceiver means to the second frequency after the OCA message is generated.

In other features the OC management means generates a cancel off-channel announcement message in at least one of the data packets when the RF transceiver means transitions from the second frequency to the first frequency before the off-channel period has elapsed.

In other features, a wireless network includes the client station and further includes second client station means for operating at the first frequency, for periodically transitioning to an active mode for a predetermined period, and for transmitting and receiving the data packets directly with the RF transceiver means during the predetermined period.

In still other features, the RF transceiver means transmits the OCA message in the at least one of the data packets during the predetermined period. The RF transceiver means transmits a cancel off-channel announcement message in at least one of the data packets during the predetermined period. The second client station means selectively transmits at least one of the data packets to the client station after the off-channel period.

A computer program stored on a computer medium and executed by a processor for a client station includes transmitting and receiving data packets at a first frequency directly to and from other client stations with a radio frequency (RF) transceiver. The computer program includes selectively operating the RF transceiver at one of the first frequency and a second frequency. The computer program includes generating an off-channel announcement (OCA) message in at least one of the data packets that indicates an off-channel period that the RF transceiver will operate at the second frequency. The computer program includes transitioning the RF transceiver to the second frequency after the OCA message is generated.

In still other features, the computer program includes generating a cancel off-channel announcement message in at least one of the data packets when the RF transceiver transitions from the second frequency to the first frequency before the off-channel period has elapsed.

In yet other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
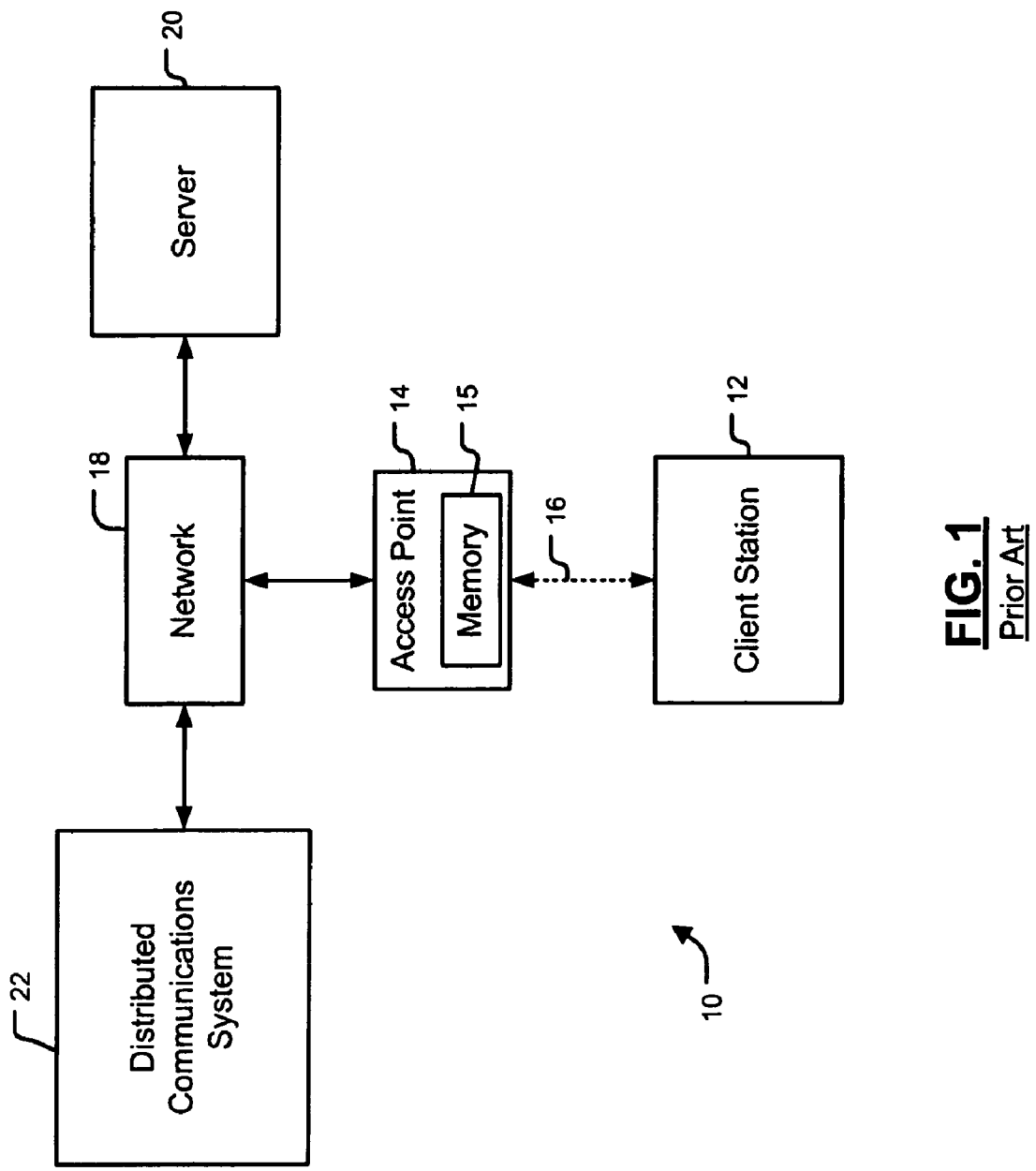
FIG. 1 is functional block diagram of a wireless network operating in an infrastructure mode.
Figure 2:
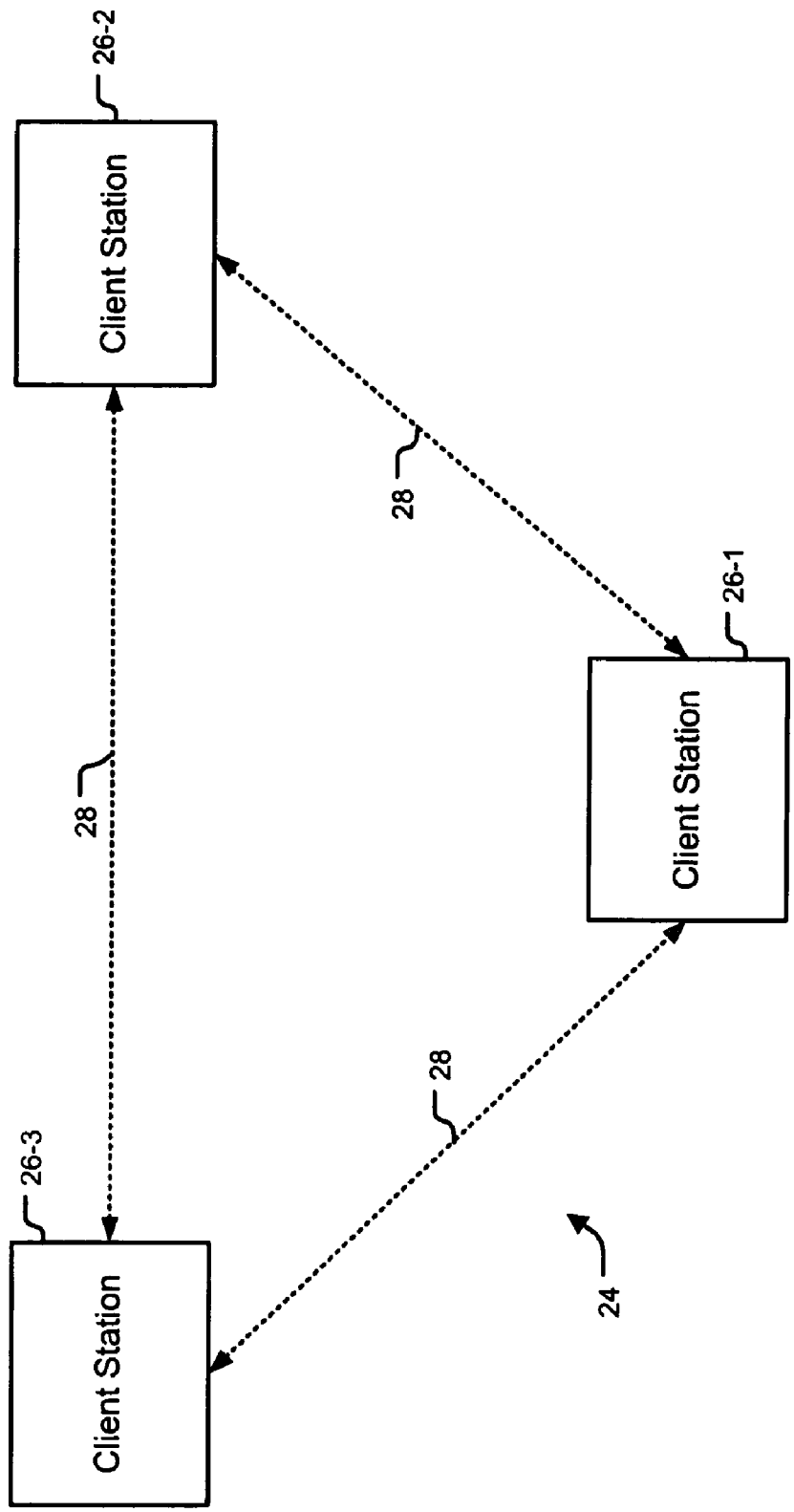
FIG. 2 is a function block diagram of a wireless network operating in an ad-hoc mode.
Figure 3:
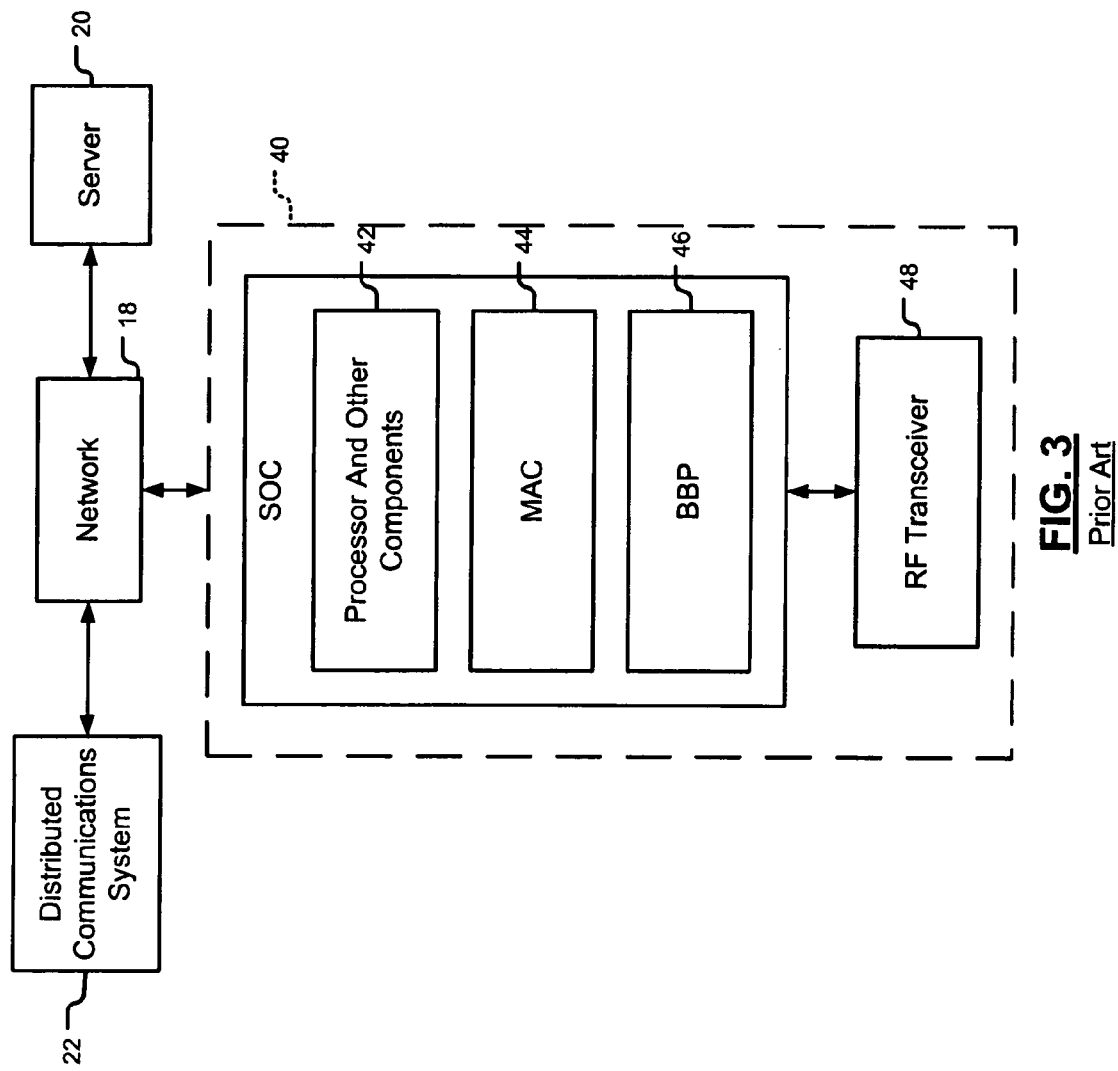
FIG. 3 is an exemplary system on a chip circuit that may be used to implement a wireless network device.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 4:
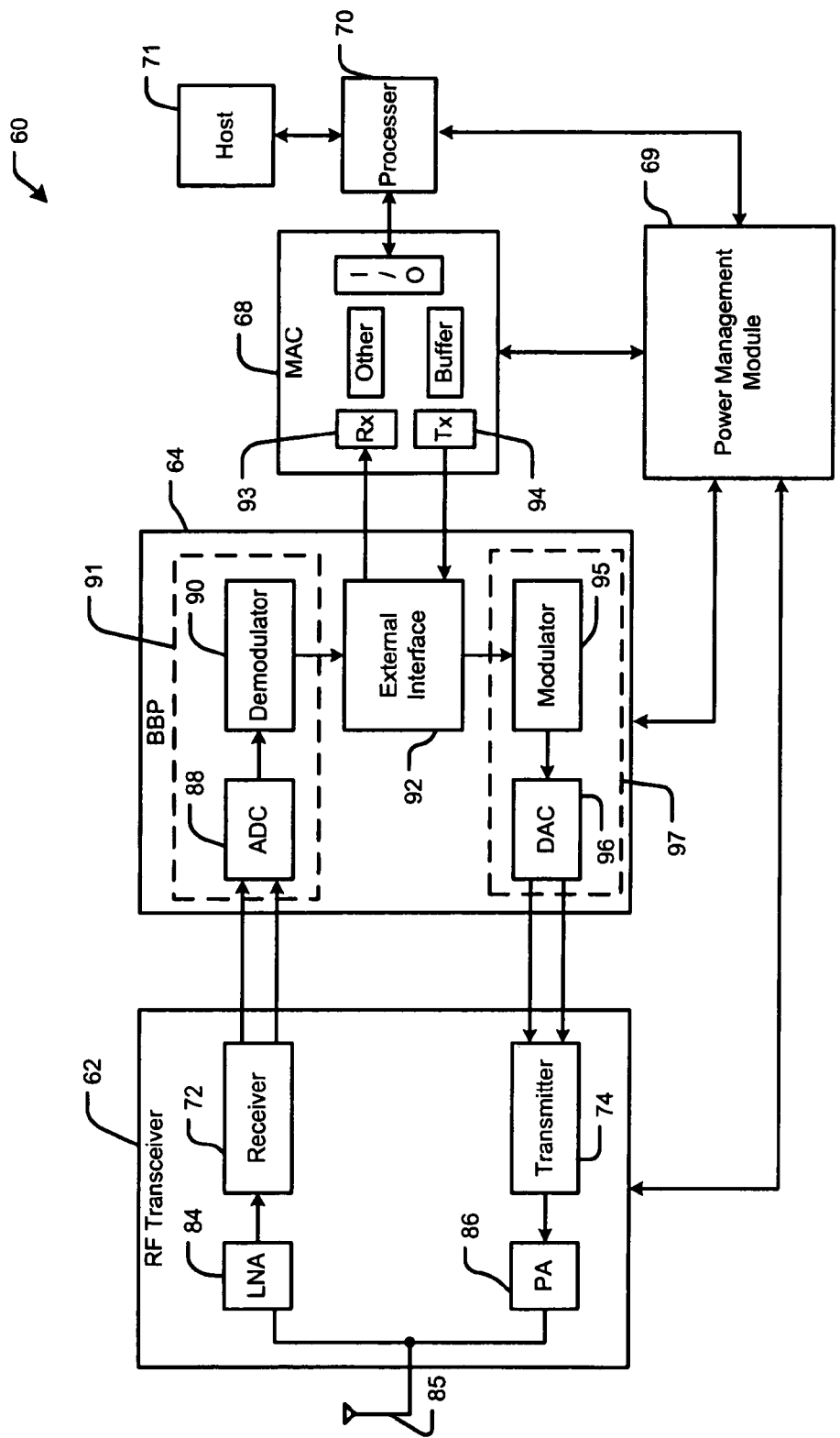
FIG. 4 is a functional block diagram of a wireless network device.

Each client station 12, 26-1, 26-2, 26-3 includes a wireless network device 60 as shown in FIG. 4. The wireless network device 60 may include an RF transceiver module 62, a baseband processor (BBP) module 64, a media access control (MAC) module 68, a power management module 69, and a processor 70 that communicates with a host 71. The RF transceiver 62 includes a receiver 72 and a transmitter 74.

During receiver operation, an input of a low noise amplifier (LNA) 84 receives signals from an antenna 85, amplifies the signals and outputs them to the receiver 72. During transmitter operation, an output of the transmitter 74 is received by a power amplifier (PA) 86, which outputs amplified signals to the antenna 85.

On the receiver side, the BBP module 64 includes an analog to digital converter (ADC) 88 that receives in-phase (I) and quadrature (Q) signals from the receiver 72. The ADC 88 communicates with a demodulator 90, which demodulates the signals. The ADC 88 and the demodulator 90 may generally be referred to as a physical receiver (PHY Rx) 91. However, when the RF transceiver 62 is incorporated in the network device 60, the PHY Rx 91 may also include the receiver 72 and the LNA 84. An output of the demodulator 90 communicates with an external interface 92, which communicates with a MAC receiver (MAC Rx) 93. A MAC transmitter (MAC Tx) 94 sends signals to the external interface 92, which are modulated by a modulator 95 and output to a digital to analog converter (DAC) 96. Both the MAC Tx 94 and MAC Rx 93 may each be a state machine that controls transmission and reception of data. The DAC 96 outputs I and Q signals to the transmitter 74. The modulator 95 and the DAC 96 may generally be referred to as a physical transmitter (PHY Tx) 97. However, when the RF transceiver 62 is incorporated in the network device 60, the PHY Tx 97 may also include the transmitter 74 and the PA 86.

The power management module 69 along with the MAC module 68 and processor 70 selects an operating mode of the wireless network device 60. The operating modes include active and inactive (i.e. low power) modes, although additional modes may be provided. In the active mode, the wireless network device is completely powered up and is fully functional. In some embodiments when the wireless network device is operating in the inactive mode, no power is supplied to the component or a sufficient amount of power is supplied to maintain logic states but not full operation. As a result, the wireless network device dissipates less power when operating in the inactive mode than in the active mode. The power management module 69 may also be located in the MAC module 68.

Figure 5:
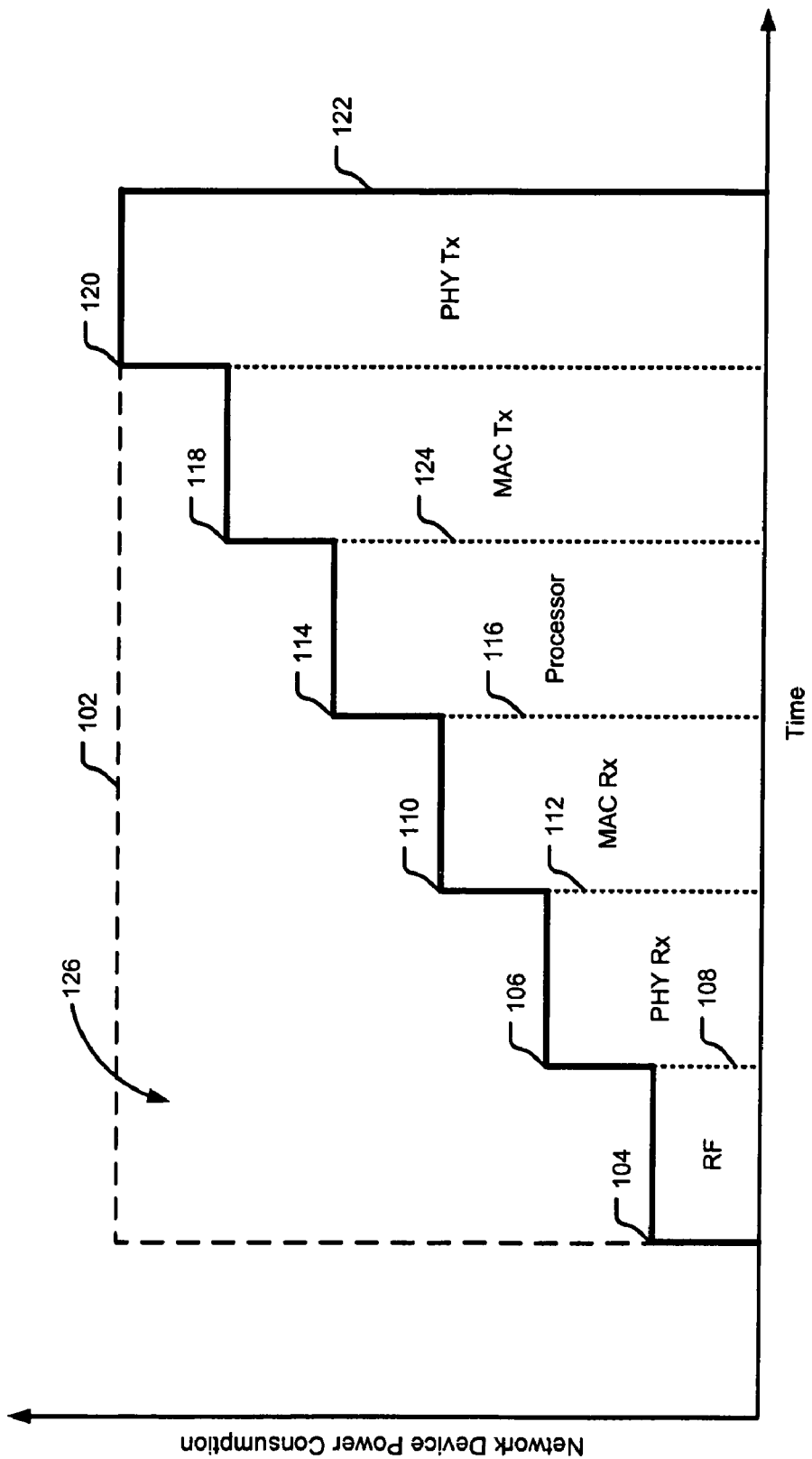
FIG. 5 is an exemplary graph depicting power consumption of the wireless network device.

Referring now to FIG. 5, an exemplary graph depicting power consumption of the network device 60 versus time is illustrated. The dashed line 102 represents the power consumed for a network device powered up in a conventional manner. However, in a multistage power-up sequence according to the present invention, the power management module 69 only activates necessary components of the network device 60. As shown, the power management module 69 activates the RF transceiver 62 in anticipation of receiving a beacon from the AP 14 at 104. If the RF transceiver 62 receives a signal with an energy greater than a predetermined energy threshold, the power management module 69 may activate the PHY Rx 91 at 106. However, if the energy of the signal is less that the predetermined energy threshold, the power management module 69 may deactivate the RF transceiver 62 at 108.

If the PHY Rx 91 determines that the signal received by the RF transceiver 62 is a frame containing a valid preamble, the power management module 69 may activate the MAC Rx 94 at 110. However, if the signal is not a frame containing a valid preamble, the power management module 69 may deactivate the PHY Rx 91 and the RF transceiver 62 at 112. The MAC Rx 93 determines whether the frame has a valid payload. For example, the payload may be valid if it contains a destination address corresponding to the network device. If the frame has a valid payload, the power management module 69 may activate the processor at 114. However, if the frame does not contain a valid payload, the power management module 69 may deactivate the MAC Rx 94, the PHY Rx 91, and the RF transceiver 62 at 116.

The processor 70 receives the frame and delivers it to the host 71. If the processor 70 and/or host 71 determines that a response is required, the power management module 69 may activate the MAC Tx 94 at 118 and the PHY Tx 97 at 120. Once the response has been sent, the power management module 69 may deactivate the network device at 122. If a response is not required, the power management module 69 may deactivate the processor 70, the MAC Rx 93, the PHY Rx 91, and the RF transceiver 62 at 124.

As previously discussed, when the network device 60 includes the RF transceiver 62, the PHY Rx 91 also includes the receiver 72 and LNA 84. In addition, the PHY Tx 97 also includes the transmitter 74 and the PA 86. Using the multistage power-up sequence according to the present invention, the receiver 72 and the LNA 84 may be activated in anticipation of receiving a beacon at 104 rather than activating the entire RF transceiver 62. In addition, the transmitter 74 and PA 86 may be powered up when the processor 70 and/or host 71 determines that a response is required.

As shown, the multistage power-up sequence of the present invention minimizes the amount of power consumed by the network device 60. More specifically, the area identified at 126 generally represents the amount of power savings the multistage power-up sequence may have over powering up the network device 60 in a conventional manner.

Figure 6:
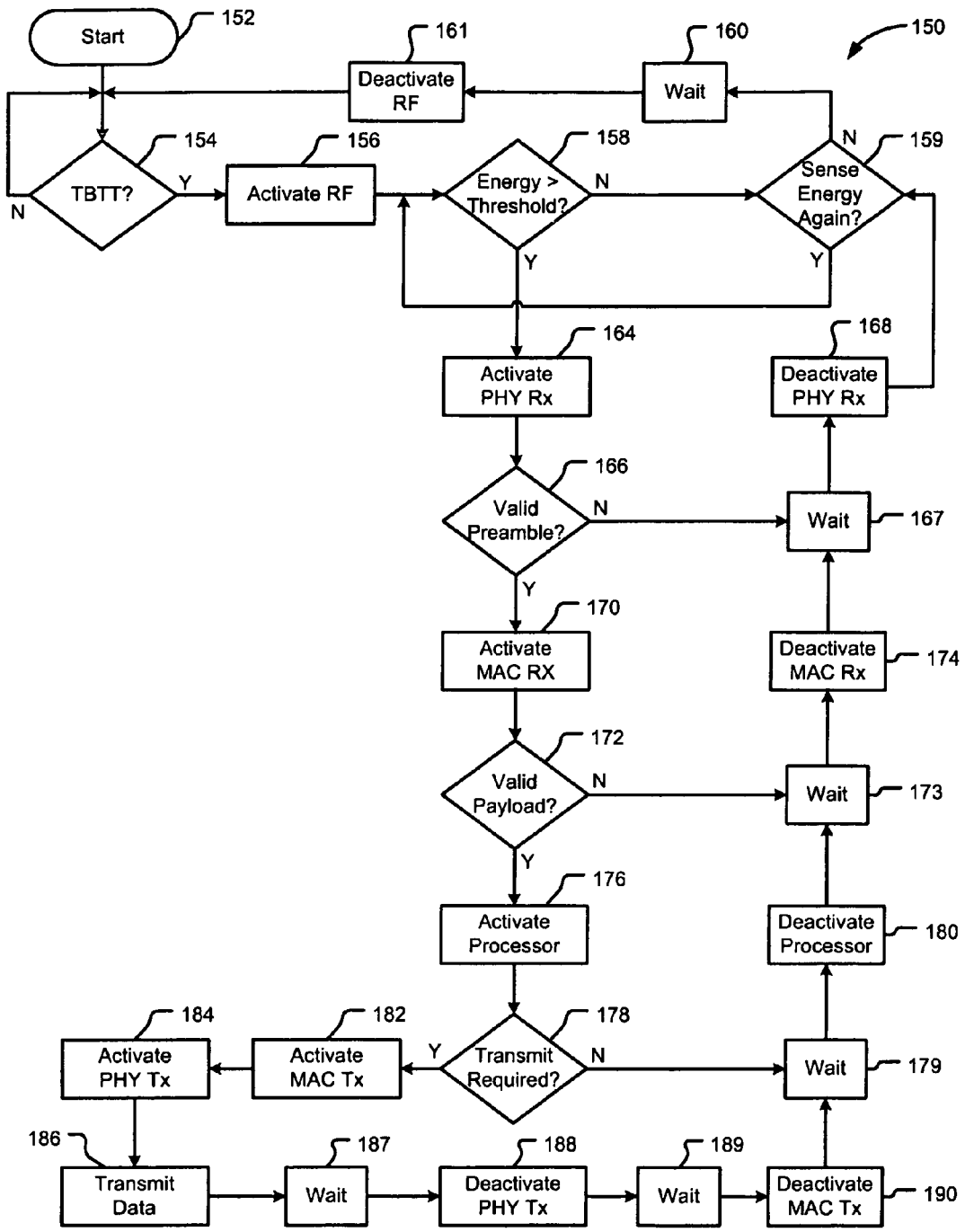
FIG. 6 is a flowchart depicting exemplary steps to power-up the wireless network device according to the present invention.

Referring now to FIG. 6, the multistage power-up sequence may implement steps generally identified at 150. The power-up sequence starts at 152. The power management module 69 anticipates a beacon from the AP 14 by monitoring the TBTT in step 154. If the power management module 69 determines that the TBTT is not approaching, the process returns to step 152. If the TBTT is approaching, the power management module 69 activates the RF transceiver 62 in step 156. In step 158, the RF transceiver 62 determines whether the energy of the signal received is greater than the predetermined energy threshold. If the energy of the signal is not greater than the predetermined energy threshold, the power management module 69 determines whether to sense the energy of the signal again in step 159. If the power management module 69 determines to sense the energy of the signal again, the process returns to step 158. If the power management module 69 determines not to sense the energy again, the power management module 69 may wait for a predetermined time in step 160 and then deactivate the RF transceiver 62 in step 161. The process returns to step 154 for the next beacon.

If the RF transceiver 62 determines that the energy of the signal is greater than the predetermined threshold in step 158, the power management module 69 may activate the PHY Rx 91 in step 164. In step 166, the PHY Rx 91 determines whether the signal contains a frame with a valid preamble. If the signal does not contain a frame with a valid preamble, the power management module 69 may wait for a predetermined time in step 167 and then deactivate the PHY Rx 91 in step 168.

If the PHY Rx 91 determines that the signal contains a frame with a valid preamble in step 166, the power management module 69 may activate the MAC Rx 93 in step 170. The MAC Rx 93 determines whether the frame contains a valid payload in step 172. If the frame does not contain a valid preamble, the power management module 69 may wait for a predetermined time in step 173 and deactivate the MAC Rx 93 in step 174.

If the PHY Rx 91 determines that the frame contains a valid payload in step 172, the power management module 69 may activate the processor 70 in step 176. The processor 70 may communicate the frame to the host 71 as previously discussed. In step 178, the processor 70 and/or the host 71 determines whether a response is required. If a response is not required, the power management module 69 may wait for a predetermined time in step 179 and then deactivate the processor 70 in step 180.

If the processor 70 and/or host 71 determines that a response is required, the power management module 69 may activate the MAC Tx 94 in step 182 and the PHY Tx 97 in step 184. In step 186, the processor 70 and/or host 71 sends the required response. Once the response has been sent, the power management module 69 may wait for a predetermined time in step 187 and then deactivate the PHY Tx 97 in step 188. Once the PHY Tx 97 is deactivated, the power management module 69 may wait for a predetermined period in step 189 and then deactivate the MAC Tx 94 in step 190.

In some embodiments, it may be desirable for the components of the network device 60 to active and/or deactivate without waiting for a predetermined period. Thus, it may be desirable to set the predetermined periods discussed with respect to steps 160, 167, 173, 179, 187, and 189 to zero.

Figure 7:
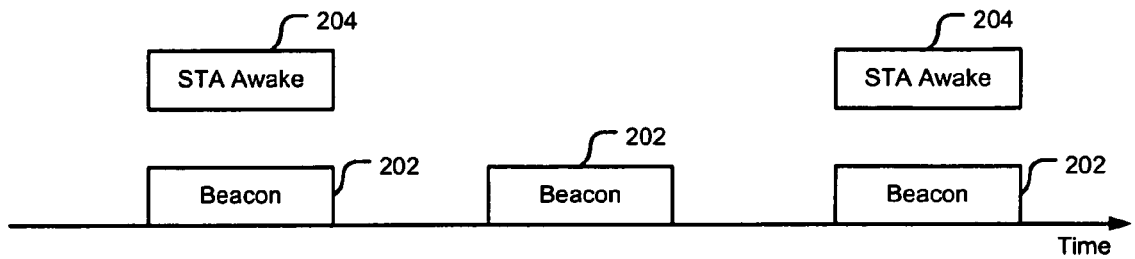
FIG. 7 is an exemplary timing diagram for a client station operating in infrastructure mode according to the prior art.

Referring to now FIG. 7, an exemplary timing diagram 200 according to the prior art is illustrated. One or more client stations 12 enter the active mode prior to the transmission of a beacon signal 202 that is periodically transmitted by the AP 14. The beacon signal 202 broadcasts information to the client stations 12 informing them that data is buffered at the AP 14. The client stations 12 stay awake for the entire beacon signal as shown at 204. To help conserve power, each client station 12 may have an associated listen interval. The listen Interval represents how long a client station sleeps before waking up to listen to the beacon signal 202. For example, if the listen interval is 1 a client station wakes up for every beacon signal and if the listen interval is 2 a client station wakes up for every other beacon signal. In FIG. 7 the client station 12 has a listen interval of 2, therefore the client station 12 wakes up for every other beacon signal. If the client station 12 has data buffered at the AP 14, it may enter the active mode to retrieve the data from the AP 14.

Figure 8:
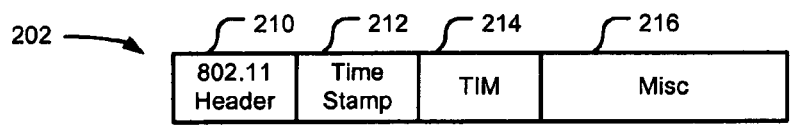
FIG. 8 is an exemplary schematic of a beacon frame according to the prior art.

Referring now to FIG. 8, the beacon signal 202 includes a header field 210, a timestamp field 212, a traffic indication map (TIM) field 214, and other miscellaneous fields 216. The header field 210 is at the beginning of the beacon signal 202 and contains information informing a client station how to handle the remaining data. The timestamp field 212 is used by the client stations 12 to update a timing synchronization function (TSF) associated with each station. The TSF is updated to ensure that the timing of each client station 12 is synchronized. The TIM field 214 contains information to inform the client stations 12 that the AP 14 has buffered data waiting. The miscellaneous fields 216 may contain data to allow client stations that are not connected to the network 10 to find and connect to the network 10. However, client stations that are already connected to the network generally do not need the information contained in the miscellaneous fields 216.

Figure 9:
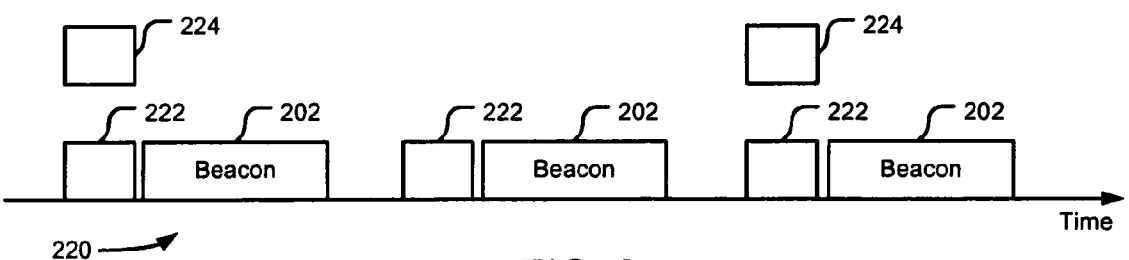
FIG. 9 is an exemplary timing diagram of a client station operating in infrastructure mode according to one embodiment of the present invention.

Referring now to FIG. 9, an exemplary timing diagram 220 according to one embodiment of the present invention is illustrated. The client stations 12 that are already connected to the network 10 may receive a short beacon signal 222 in place of the beacon signal 202. The short beacon signal 222 contains information for the client stations 12 that are already connected to the network 10. When the AP 14 transmits the short beacon signal 222, the connected client stations 12 need to stay awake for a shortened time as shown at 224. The AP 14 may also transmit the longer or standard beacon 202 for prior art clients that are not compatible with the short beacon signal 222 and/or for any client stations that wish to join the network 10.

Figure 10:
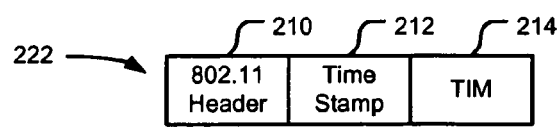
FIG. 10 is an exemplary schematic of a short beacon according to one embodiment of the present invention.

Referring now to FIG. 10, the short beacon signal 222 is illustrated. The short beacon signal 222 only contains fields that are required by the client stations 12 that are already connected to the network 10. The fields include the header field 210, the timestamp field 212, and the TIM field 214. As previously discussed, the header field 210 informs the client stations 12 how to handle the remaining data. The timestamp field 212 is used synchronize timing of the client stations 12 connected to the network 10. The TIM field 214 informs the client stations 12 that the AP 14 has buffered data waiting for them. The short beacon signal 222 is offset from the beacon signal 202 so that transmission of the short beacon signal 222 is complete before the TBTT. Since transmission of the short beacon signal 222 is complete before the TBTT, the AP 14 may transmit the standard beacon 202 at the TBTT for prior art clients that are unaware of the short beacon signal 222.

Figure 11:
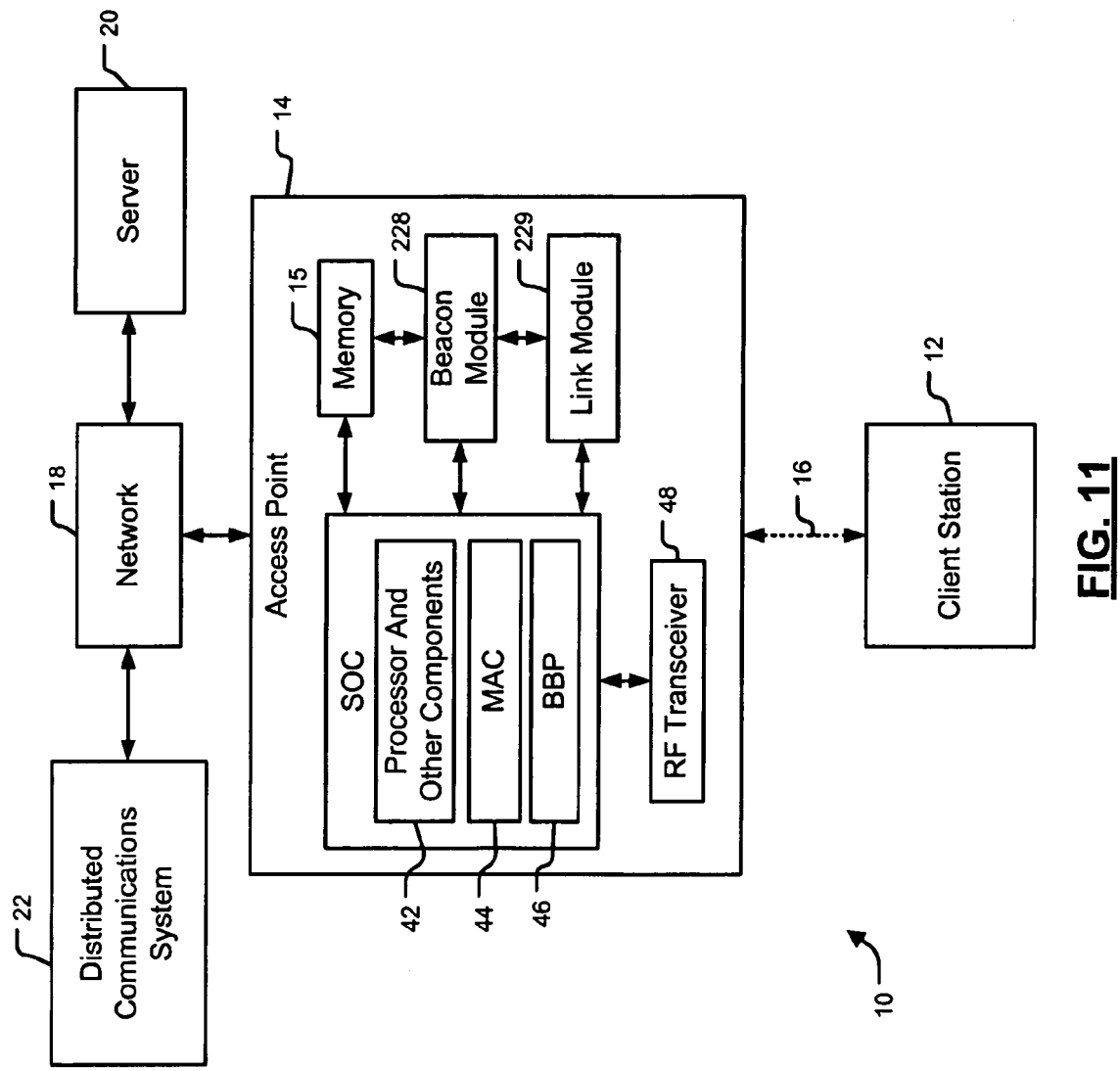
FIG. 11 is a functional block diagram of an exemplary network implementing short beacons according to one embodiment of the present invention.

Referring now to FIG. 11, a beacon control module 228 may be incorporated in the AP 14 as shown. The beacon control module 228 may control transmission of the standard beacon signal 202 and the short beacon signal 222 as described above. The beacon control module 228 may also communicate with a link connection module 229 that establishes and maintains a link between the AP 14 and the client station 12 based on data in the standard beacon signal 202. Once the link has been established, the client station 12 may wake up for the short beacon 222 rather than the standard beacon 202.

Figure 12:
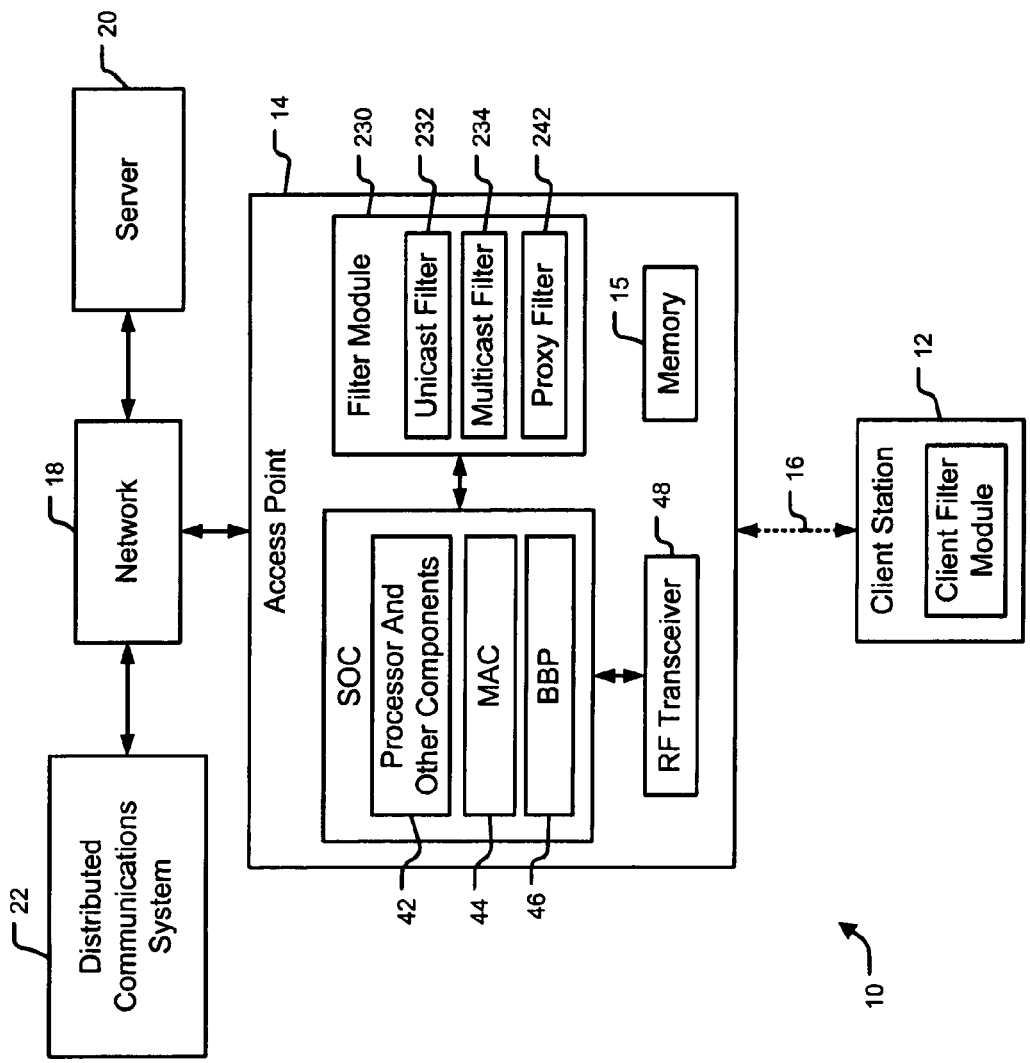
FIG. 12 is a functional block diagram of an exemplary wireless network using a filter module according to one embodiment of the present invention.

Referring now to FIG. 12, a filter module 230 may be incorporated in the AP 14 as shown. When the client station 12 is in the power save mode it may only have an interest in certain types of data. The client station 12 periodically wakes up to receive a beacon sent from the AP 14. If the beacon indicates that data is buffered at the AP 14, the client station 12 sends a power save poll (PS-Poll) frame to the AP 14 requesting the data. When the AP 14 receives the PS-Poll frame, the AP 14 sends the buffered data to the client station 12. Once the client station 12 receives the data, it applies filters to determine if the data is of any significance to the client station 12. The operation of requesting and receiving the buffered data requires the client station 12 to stay awake and consequently consumes additional power. The filter module 230 allows the AP 14 to reduce the amount of power consumed by the client station 12 by filtering unwanted data on behalf of the client station 12.

The client station 12 may include a client filter module 231 that generates a filter parameter, which is transmitted to the AP 14, indicating specific types of data that the client station 12 wishes to receive. More specifically, the client station 12 may have an interest in certain types of unicast and/or multicast data. Therefore, the filter module 230 may include a unicast filter 232 and a multicast filter 234. The unicast filter 232 may be configured by the client station 12 to allow certain types of unicast transmissions. Some criteria that may be used to configure the unicast filter 232 include, but are not limited to, a source MAC address, a priority of data, a source address and/or port, a destination address and/or port, and a protocol type. When the unicast data matches the unicast filter 232, the AP 14 may set a bit in the TIM field 214 to notify the client station 12 of the buffered unicast data. If the unicast data does not match the unicast filter 232, the AP 14 may discard the data.

Figure 13A:
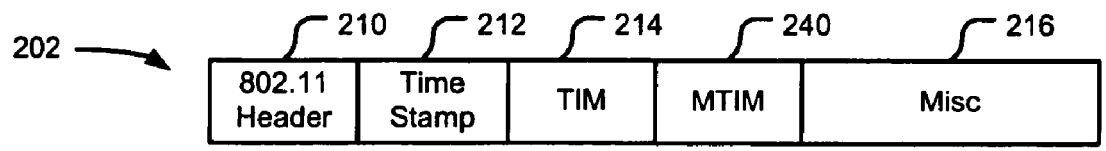
FIG. 13A is an exemplary schematic of a beacon incorporating a multicast indication map frame according to one embodiment of the present invention.
Figure 13B:
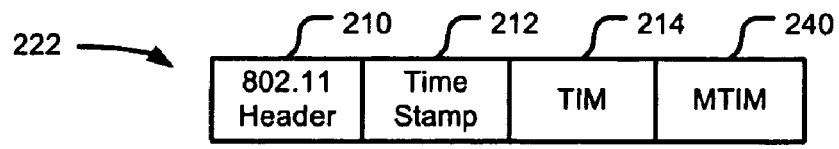
FIG. 13B is an exemplary schematic of a short beacon incorporating a multicast indication map frame according to some embodiments of the present invention.

The multicast filter 234 works in a similar manner as the unicast filter 232. However, the AP 14 uses the multicast filter 234 to filter multicast and/or broadcast data. To support the multicast filter 234 a Multicast Traffic Indication Map (MTIM) frame 240 may be incorporated in the beacon 202 as shown in FIG. 13A. The MTIM frame 240 contains a bit for each client station that instantiates the multicast filter 234 to filter broadcast and/or multicast traffic. The bit corresponding to a client station is set when buffered broadcast and/or multicast traffic matches the multicast filter 234. In addition, the MTIM frame 240 may be used with the short beacon 222 as shown in FIG. 13B.

There may be certain types of data that the client station 12 always responds to in the same manner. Therefore, the client station 12 may remotely configure a proxy filter module 242 as shown in FIG. 12 to respond to certain types of data on its behalf. For example, a remote client may wish to contact the client station 12. The remote station may send an address resolution protocol (ARP) request with an IP address associated with the client station 12. An ARP request is typically used to determine a MAC address of a client station. Rather than waking the client station 12 to respond to the ARP request, the AP 14 may use the proxy filter module 242 to respond to the ARP request on its behalf. Although an ARP request is described herein for illustrative purposes, the proxy filter module 242 may be configured to respond to any type of data on behalf of the client station 12.

Figure 14:
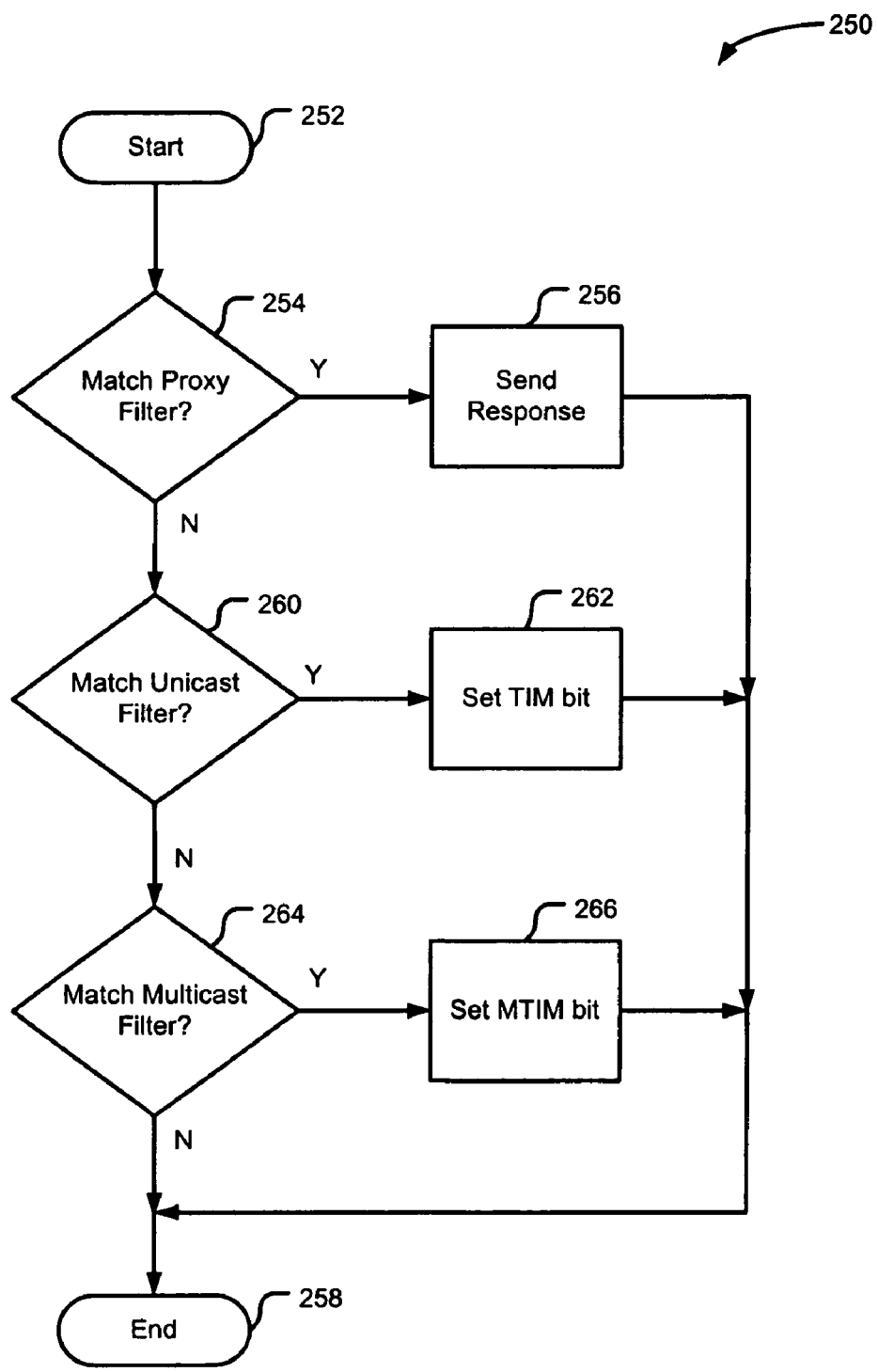
FIG. 14 is an exemplary flowchart that illustrates steps taken by the filter module according to one embodiment of the present invention.

Referring now to FIG. 14, the filter module 230 may implement steps generally identified at 250 to filter data on behalf of the client station 12. The process begins in step 252 when the AP 14 receives data that is intended for the client station 12. In step 254, the filter module 230 determines whether the data matches the proxy filter module 242. If the data matches the proxy filter module 242, the AP 14 sends a predetermined response on behalf of the client station 12 in step 256 and the process ends in step 258.

If the data does not match the proxy filter module 242 in step 254, the filter module 230 determines whether the data matches the unicast filter 232 in step 260. If the data matches the unicast filter 232, the AP 14 sets the TIM bit for the corresponding client station 12 in step 262 and the process ends in step 258.

If the data does not match the unicast filter 232 in step 260, the filter module 230 determines whether the data matches the multicast filter 234 in step 264. If the data matches the multicast filter 234, the AP 14 sets the MTIM bit corresponding with the client station 12 in step 266 and the process ends in step 258.

Figure 15:
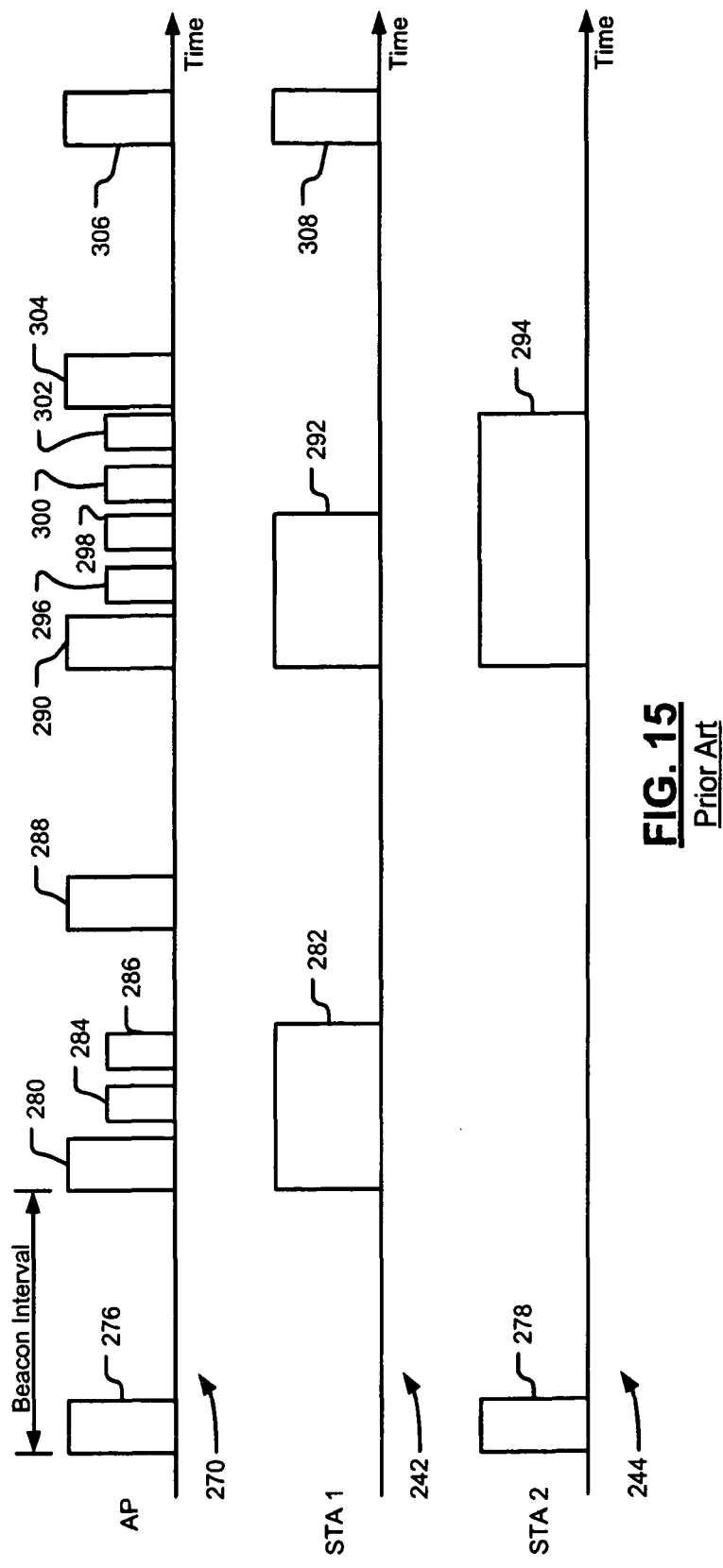
FIG. 15 is an exemplary timing diagram an access point (AP) and two client stations operating in infrastructure mode wherein unicast data is transferred according to the prior art.

Referring now to FIG. 15, exemplary timing diagrams of a unicast transmission from an AP to two client stations that are in power save mode are illustrated at 270, 272, and 274. Every beacon interval, the AP 14 transmits a beacon frame with the TIM field 214. Station 1 has a listen interval of 2 and wakes up every other beacon frame. Station 2 has a listen interval of 3 and wakes up every third beacon frame.

A first beacon frame 276 is transmitted indicating that there are frames buffered for station 1. Station 2 wakes up to inspect the first beacon frame 276 at 278. Since there are no frames buffered for station 2, it can return to sleep. A second beacon frame 280 is transmitted indicating that there are buffered frames for station 1 and station 2. Station 1 wakes up at 282 to listen to the second beacon frame 280. Station 1 sends a PS-Poll frame to the AP 14 to retrieve the buffered frame for station 1 at 284. At 286, the AP 14 sends the buffered frame to station 1. Once station 1 receives the buffered frame, it may return to sleep. A third beacon frame 288 is transmitted indicating that there are buffered frames for station 1 and station 2. However, due to the respective listen intervals of stations 1 and 2, neither station wakes up to inspect the third beacon frame 288.

A fourth beacon frame 290 is transmitted indicating that there are still buffered frames for station 1 and station 2. Both stations wake up as shown at 292 and 294 to receive the fourth beacon frame 290. Since there are frames for both stations, each station must wait for its turn to transmit a PS-Poll frame. The stations randomly select a slot within a contention window to prevent them from transmitting at the same time. Station 1 has a shorter random delay and transmits a PS-Poll frame at 296. At 298, the AP 14 transmits the buffered frame to station 1. Once station 1 receives the frame, it can return to sleep and station 2 may transmit a PS-Poll frame at 300. At 302, the AP 14 transmits the buffered frame to station 2. Once station 2 receives the buffered frame, it can return to sleep.

A fifth beacon frame 304 is transmitted, however neither station wakes up to receive it due to the respective listen intervals. A sixth beacon frame 306 is transmitted without any frames buffered at the AP 14. Station 1 wakes up at 308 to receive the sixth beacon and subsequently goes back to sleep.

Figure 16:
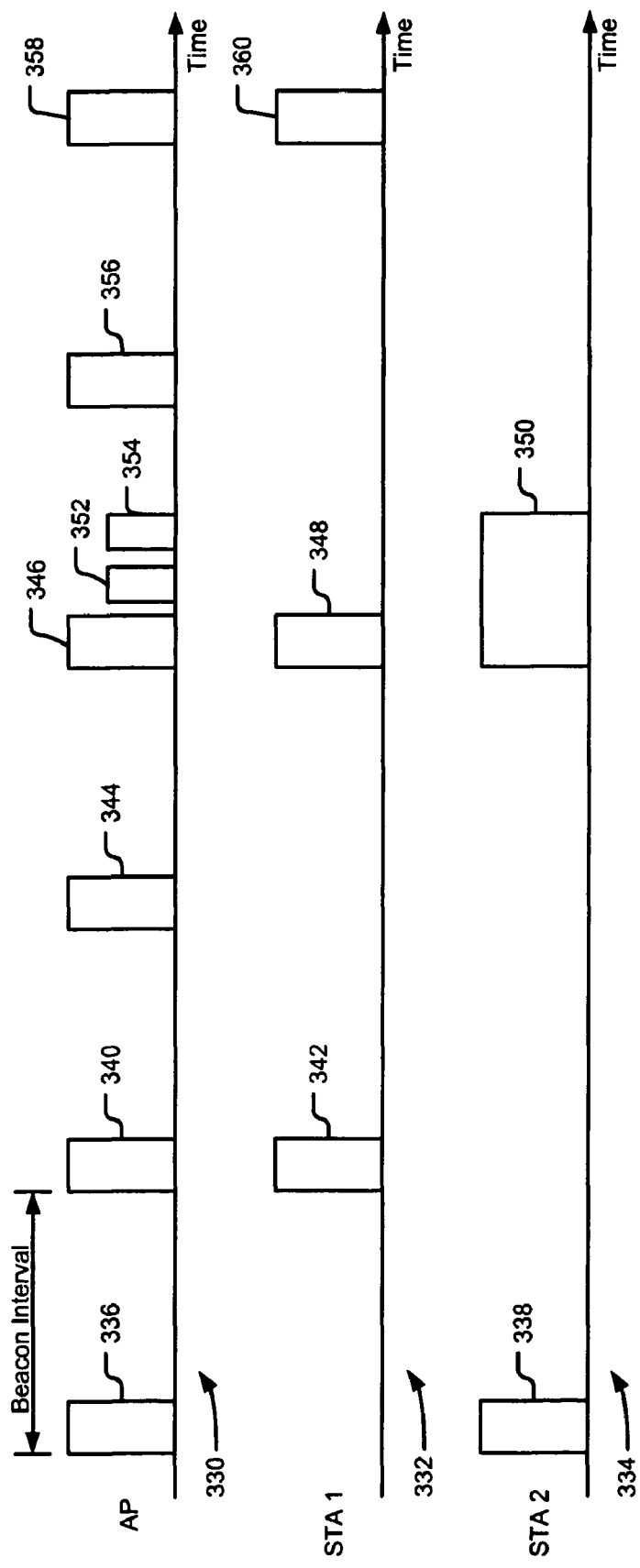
FIG. 16 is an exemplary timing diagram of an AP and two clients stations operating in infrastructure mode wherein unicast data is transferred according to one embodiment of the present invention.

Referring now to FIG. 16, an exemplary timing diagram of unicast traffic is illustrated at 330, 332, 334 wherein the AP 14 uses the unicast filter 232 to filter data on behalf of station 1 and station 2. Station 1 has configured the unicast filter 232 to filter out any frames that do not have a specific protocol identification. The AP 14 receives frames for station 1 that do not match the unicast filter 232. Therefore, a first beacon frame 336 is transmitted without indicating that there are buffered frames for station 1. Station 2 wakes up to inspect the first beacon frame at 338. Since there are no buffered frames for station 2, it can return to sleep. A second beacon frame 340 is transmitted and station 1 wakes up to inspect the beacon at 342. Station 1 subsequently goes back to sleep since the AP 14 has filtered the traffic on behalf of station 1. The AP 14 receives frames for station 1 and station 2. However, the frames for station 1 do not match the unicast filter 232. Therefore, the AP 14 transmits a third beacon frame 344 indicating that there are only buffered frames for station 2. However due to the listen intervals, station 1 and station 2 remain asleep.

The AP 14 receives frames for station 1 and station 2. The frame for station 1 does not match the unicast filter 232 and is discarded by the AP 14. A fourth beacon frame 346 is transmitted indicating that there are buffered frames for station 2. Both stations wake up as shown 348 and 350 to receive the fourth beacon frame 346. Station 1 goes back to sleep after the fourth beacon frame 346 since the AP 14 has filtered the undesired frame on its behalf. Station 2 sends a PS-Poll frame to the AP 14 at 352. The AP 14 sends the buffered frame to station 2 at 354 and station 2 subsequently goes back to sleep. A fifth beacon 356 is transmitted but neither station wake up due to the respective listen intervals. A sixth beacon 358 is transmitted and station 1 wakes up at 360. Since the AP 14 does not have buffered frames for station 1, it can go back to sleep when the sixth beacon frame 360 ends. As shown in FIG. 16, station 1 and station 2 can sleep longer when the AP 14 uses the unicast filter 232 to filter unicast frames on behalf of the stations.

Figure 17:
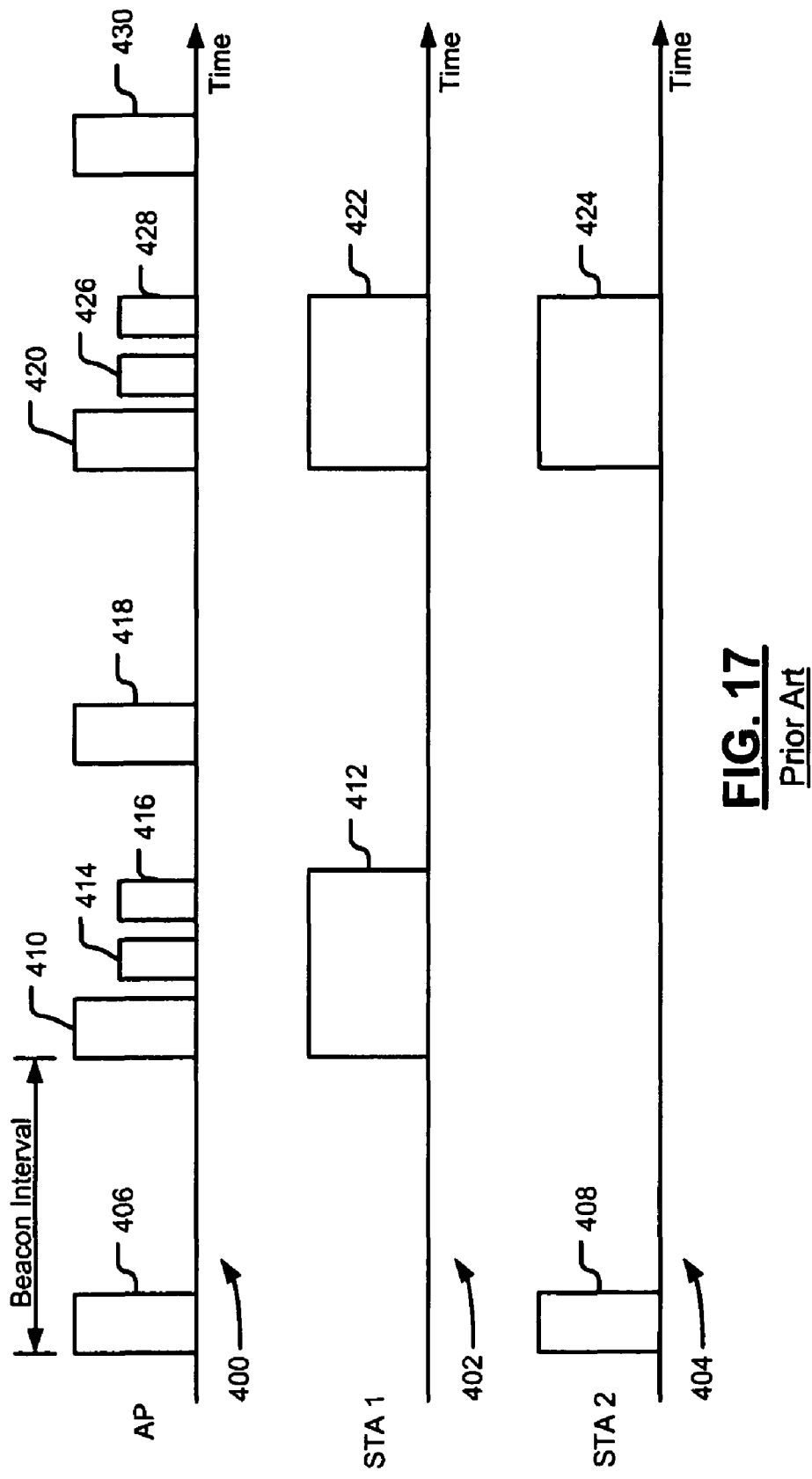
FIG. 17 is an exemplary timing diagram of an AP and two client stations wherein multicast and broadcast data is transferred according to the prior art.

Referring now to FIG. 17 exemplary timing diagrams of multicast and/or broadcast transmissions from the AP 14 to two client stations that are in power save mode are illustrated at 400, 402, and 404. When multicast and/or broadcast frames are received, the AP 14 buffers the frames in a similar manner as the unicast frames. The frames are buffered whenever any station associated with the AP 14 is sleeping. The AP 14 indicates whether any broadcast or multicast data frames are buffered by setting the first bit in the TIM frame 214. Beacons are periodically broadcast that contain the TIM frame 214. At a fixed number of beacon intervals, a Delivery Traffic Indication Map (DTIM) frame is sent. Buffered broadcast and multicast frames are transmitted after a beacon containing the DTIM frame has been transmitted by the AP 14.

In FIG. 17 the DTIM interval is set to 2, therefore every other beacon contains the DTIM frame. Station 1 and station 2 are operating in the power save mode and have a listen interval of 2 and 3, respectively. A first beacon frame 406 is transmitted that only contains the TIM frame. Station 1 remains asleep due to its listen interval. However, station 2 wakes up at 408 to listen to the first beacon frame 406 and subsequently goes back to sleep. A second beacon frame 410 is transmitted that contains the DTIM frame and the first bit of the TIM frame 214 is set indicating that broadcast and/or multicast frames are buffered at the AP 14. Station 1 wakes up to receive the second beacon 410 at 412. The AP 14 transmits the buffered broadcast frame at 414 and the buffered multicast frame at 416. Once station 1 receives the buffered multicast frame it may return to sleep.

A third beacon 418 is transmitted that only contains the TIM frame 214. However, neither station wakes up due to the respective listen intervals. A fourth beacon frame 420 that contains the DTIM frame is transmitted. The first TIM bit is set in the fourth beacon frame 420 indicating that the AP 14 has buffered broadcast and/or multicast frames. Station 1 wakes up at 422 and station 2 wakes up at 424. The AP 14 transmits the buffered broadcast frame at 426 and the buffered multicast frame at 428. When station 1 and station 2 receive the buffered multicast frame, they can both return to sleep. A fifth beacon 430 that only contains the TIM frame 214 is transmitted. However, station 1 and station 2 remain asleep due to the respective sleep intervals.

Figure 18:
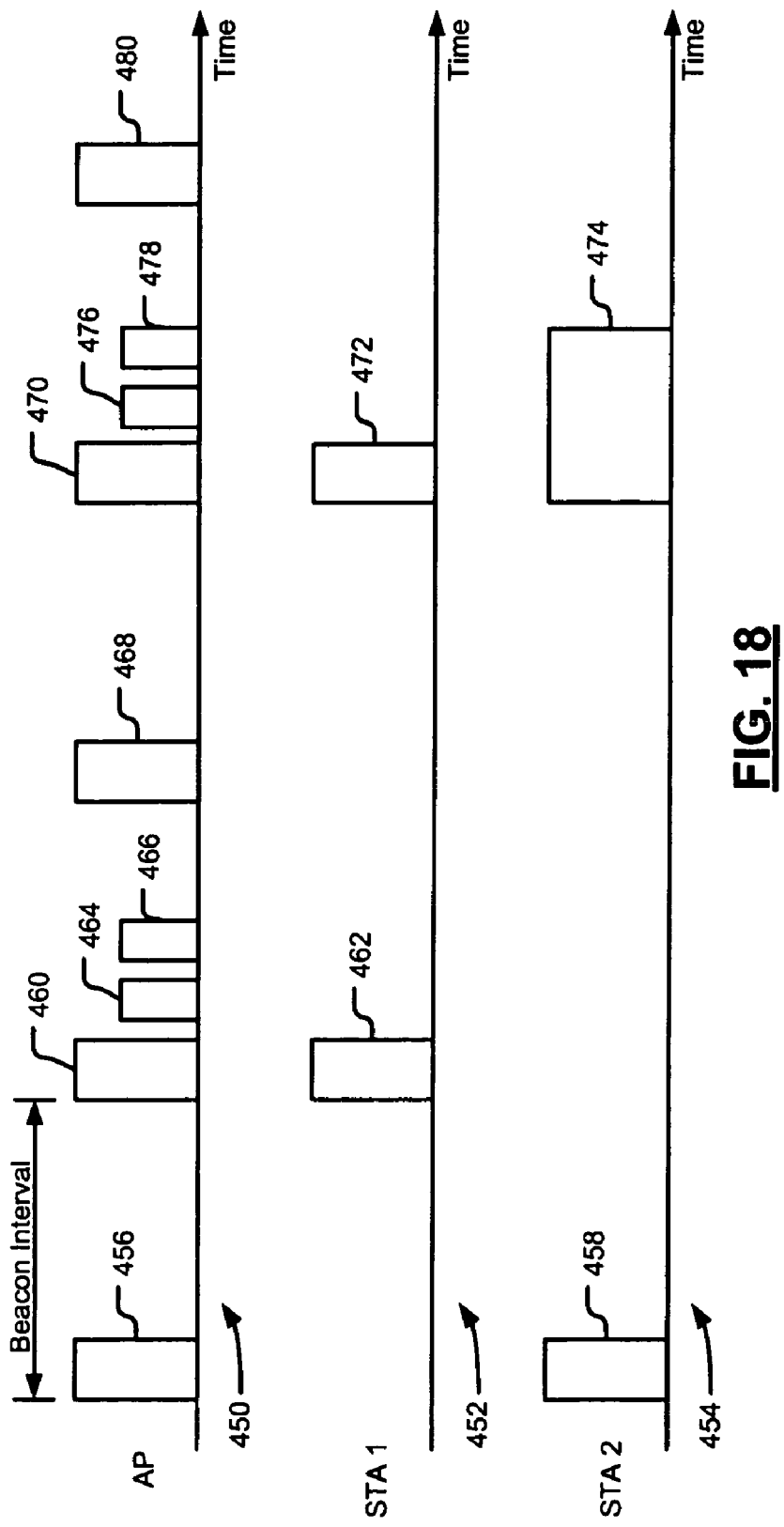
FIG. 18 is an exemplary timing diagram of an AP and two client stations wherein multicast and broadcast data is transferred according to one embodiment of the present invention.

Referring now to FIG. 18, exemplary timing diagrams 450, 452, 454 of unicast data are illustrated wherein the AP 14 uses the multicast filter 234 to filter data on behalf of station 1 and station 2. The DTIM interval is set to 2, therefore every other beacon contains the DTIM frame. In addition, station 1 and station 2 are operating in the power save mode. Before entering the power save mode, station 1 notified the AP 14 that it is not interested in any broadcast or multicast data. Station 2 did not configure the multicast filter 234 before entering the power save mode. Station 1 has a listen interval of 2 and station 2 has a listen interval of 3.

A first beacon frame 456 is transmitted that only contains the TIM frame 214. Station 1 remains asleep due to its listen interval. However, station 2 wakes up at 458 to listen to the first beacon frame 456 and subsequently goes back to sleep. A second beacon frame 460 is transmitted that contains the DTIM frame and the first bit of the TIM frame 214 is set indicating that broadcast and/or multicast data is buffered at the AP 14. However, the MTIM bit associated with station 1 has not been set because station 1 is not interested in broadcast or multicast data. Station 1 wakes up at 462 to receive the second beacon frame 460 and subsequently goes back to sleep because the MTIM frame 240 did not indicate that there is buffered broadcast and/or multicast data for station 1. The AP 14 transmits buffered broadcast frames to a third station (not shown) at 464. At 466, the AP 14 transmits buffered multicast data to the third station.

A third beacon 468 is transmitted that only contains the TIM field 214. However, neither station wakes up due to the respective listen intervals. A fourth beacon frame 470 that contains the DTIM frame is transmitted. The MTIM bit associated with station 2 is set in the fourth beacon 470. However, the MTIM bit associated with station 1 has not been set because station 1 is not interested in broadcast or multicast data. Station 1 wakes up at 472 to receive the fourth beacon frame 470 and subsequently goes back to sleep because its MTIM bit is not set. Station 2 wakes up at 474 to receive the fourth beacon frame 470. Since the MTIM bit associated with station 2 is set, station 2 stays awake to receive the broadcast data transmitted at 476 and the multicast data transmitted at 478. Station 2 goes back to sleep after receiving the buffered multicast traffic from the AP 14.

A fifth beacon 480 that only contains the TIM frame 214 is transmitted. However, station 1 and station 2 remain asleep due to the respective listen intervals. As shown in FIG. 18, when the AP 14 uses the multicast filter 234 to filter broadcast and/or multicast traffic on behalf of a client station, the client station can sleep longer and therefore consume less power.

Figure 19:
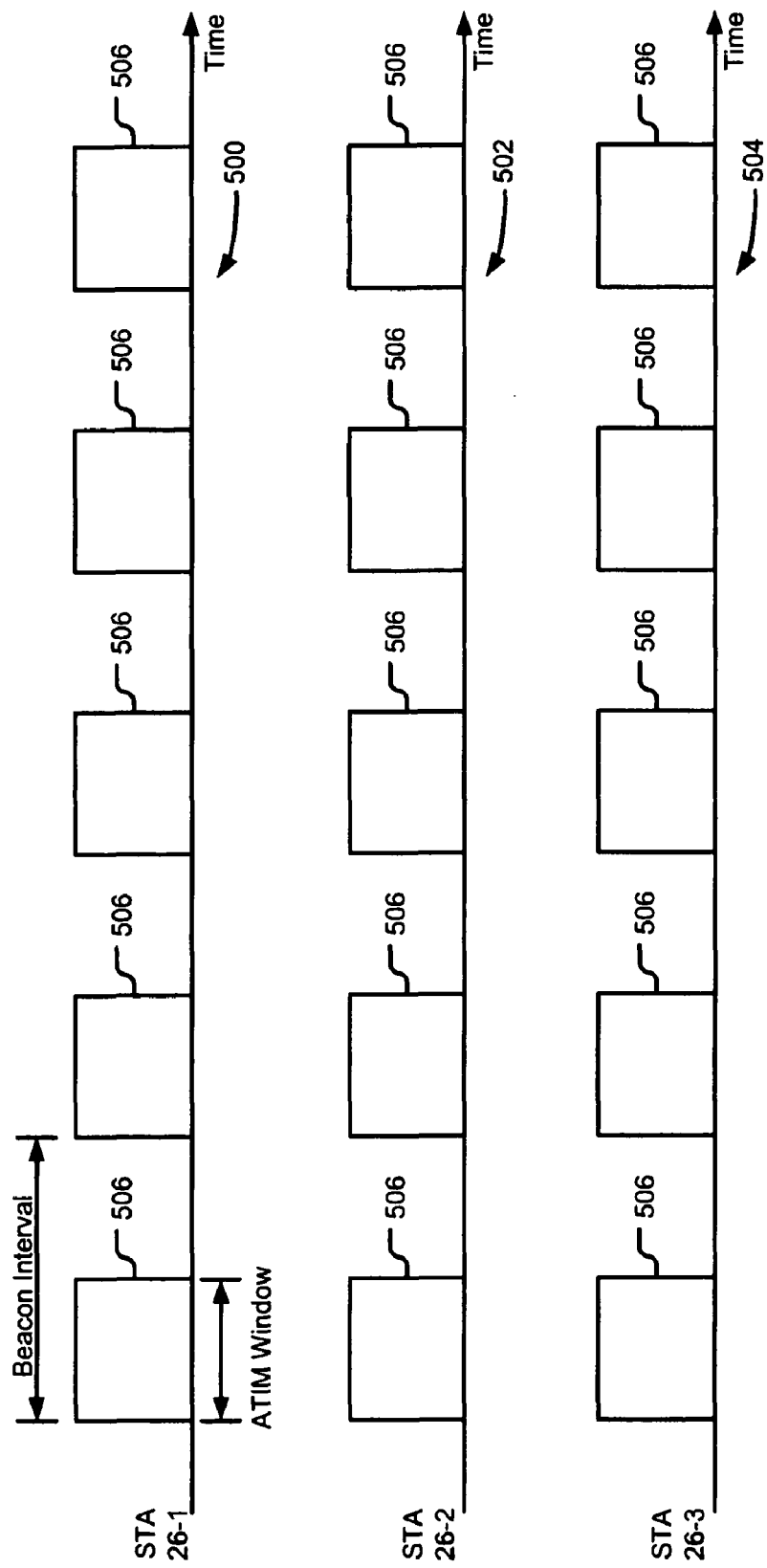
FIG. 19 is an exemplary timing diagram of three client stations in ad-hoc mode according to the prior art.

In ad-hoc networks client stations use announcement traffic indication messages (ATIMs) to preempt other stations in the network from sleeping. Each station in the network periodically wakes up to receive a beacon and stays awake thereafter for an ATIM window. If a first station wishes to send traffic to a second station, the first station sends an ATIM frame during the ATIM window to notify the second station of the traffic. When the second station receives an ATIM frame, it stays awake for a subsequent ATIM window to receive the data from the first station. FIG. 19 depicts exemplary timing diagrams of client stations 26-1, 26-2, and 26-3 at 500, 502 and 504 respectively. The client stations 26-1, 26-2, and 26-3 periodically wake up for the ATIM window at 506 although there is not any data being transferred between them. Periodically waking up for the ATIM window and the beacon can be a significant drain of power on the client stations 26-1, 26-2, 26-3.

Figure 20:
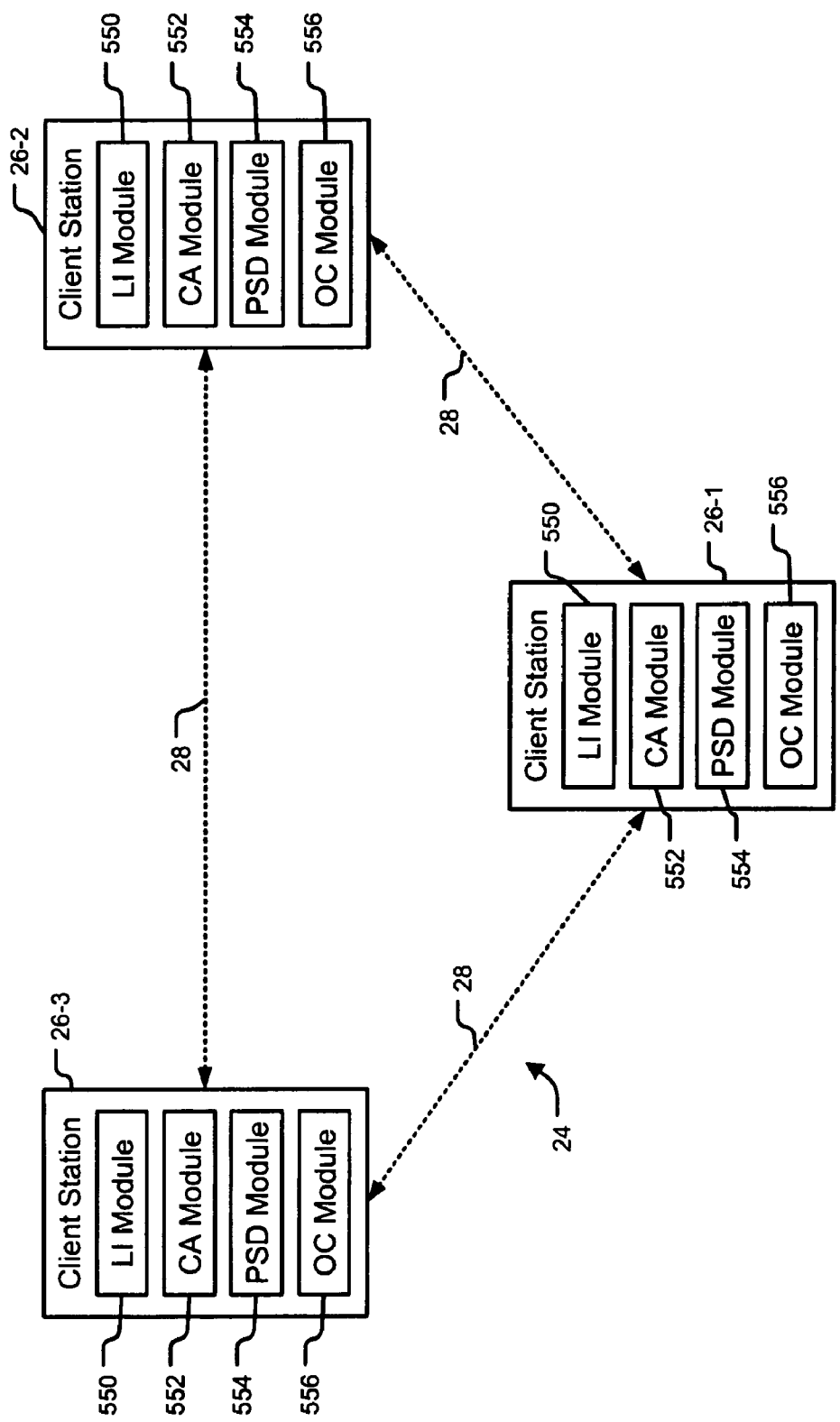
FIG. 20 is a functional block diagram of three client stations utilizing a listen interval module, a contention avoidance module, a power save delivery module, and an off-channel module according to one embodiments of the present invention.

Referring now to FIG. 20, the client stations 26-1, 26-2, and 26-3 of the second wireless network 24 are operating in ad hoc mode and utilizing power saving modules according to some embodiments of the present invention. More specifically, each station 26-1, 26-2, and 26-3 may include a listen interval (LI) module 550, a contention avoidance (CA) module 552, a power save delivery (PSD) module 554, and an off-channel (OC) module 556.

The LI module 550 allows the client stations 26-1, 26-2, and 26-3 to choose a listen interval (LI) that corresponds to a number of beacon intervals that it will listen for an ATIM frame during the ATIM window. Each client station 26-1, 26-2, 26-3 may announce its respective listen interval to the other stations. To announce the listen interval, a special listen interval frame may be embedded in a beacon periodically generated by the client stations 26-1, 26-2, 26-3. Alternatively, each station 26-1, 26-2, 26-3 may send a special message to individual stations (i.e., unicast) or to multiple client stations 26-1, 26-2, 26-3 (i.e., multicast/broadcast).

The second network 24 may have an associated beacon number. The beacon number may be described with the following equation:

$$BN = \frac{TBTT}{BI}$$

where BN is the beacon number, TBTT is the target beacon transmission time of the beacon, and BI is the beacon interval. The LI module 550 activates a client station for the ATIM window when the beacon number is a multiple of its listen interval. More specifically, the LI module 550 activates a client station for the ATIM window when BN mod LI=0. The LI module 550 tracks the listen interval of other client stations in the second network 24. Therefore, a client station that wishes to transmit data to a second client station may wakeup to send an ATIM according to the listen interval of the second client station.

The CA module 552 allows the client stations 26-1, 26-2, 26-3 to cooperatively determine an ATIM transmission schedule. With the ATIM transmission schedule only one client station transmits during the ATIM window following the beacon. The ATIM transmission schedule helps to minimize and/or avoid contention and thus the ATIM window may be shorter. Shortening the ATIM window allows client stations that do not have data to receive to return to sleep quicker and helps reduce power consumption.

The CA module 552 tracks the number of stations in the second network 24 and assigns a unique identifier to its associated client station. The CA module 552 determines the ATIM transmission schedule based on the beacon number, the number of stations in the network, and the unique identifier. More specifically, the CA module 552 schedules the client station to transmit when:

$$BN \bmod N = SN$$

where BN is the beacon number, N is the total number of stations in the second network 24, and SN is the unique identifier assigned to the client station. While a particular method is described herein for illustrative purposes, skilled artisans will appreciate that other methods may be used to determine the ATIM transmission schedule.

The PSD module 554 allows client stations in the second network 24 to negotiate a transmission schedule that is independent of the beacon and/or ATIM window. Thus, the PSD module 554 may allow two or more client stations to schedule transmissions at an interval that is longer than the beacon interval to reduce power consumption. To negotiate transmission schedule, a first client station may send a PSD frame (not shown) to a second client station. The PSD frame preferably includes a start time and a period. The start time allows the PSD module 554 to determine when to wake up the client station. The period allows the PSD module 554 to determine how often to wake up the client station to exchange data. Once the transmission schedule has been negotiated, the client stations wake up according to the schedule, exchange data and then go back to sleep.

Suppose, for example, that client stations 26-2 and 26-3 negotiate a transmission schedule with a start time of 1000 ms and a period of 20 ms. Both stations 26-2 and 26-3 may transition to the active mode at 1000 ms, exchange data, and then transition to the inactive mode until 1020 ms. At 1020 ms, stations 26-2 and 26-3 may wake up again, exchange data, and then go back to sleep until 1040 ms.

When operating in ad hoc mode, there may be situations when a client station may switch to a different frequency for a brief period of time. For example, if a client station detects radar on the frequency of the network 24, it may switch to a second frequency to obtain measurements in an attempt to find a frequency that is not interfering with the radar. When the client station switches to the second channel, it may send an off channel announcement (OCA) frame to the other stations informing them that it will not be unavailable for a period of time. The OCA frame may be broadcast and/or unicast to specific stations. If the client station returns to the frequency before the period of time has elapsed, it may send a cancel off channel announcement (COCA) frame. When the client stations are in power save mode, the OCA frame and the COCA frame need to be transmitted at a time when the other client stations will be awake to receive them.

The OC module 556 manages the transmission of the OCA frame and the COCA frame. More specifically, the OC module 556 determines when it may send the OCA and COCA frames so that the client stations in power save mode may receive the frames. In a typical power save scheme, the OC module 556 may send the OCA and COCA frame during the ATIM window following the beacon frame.

Figure 21:
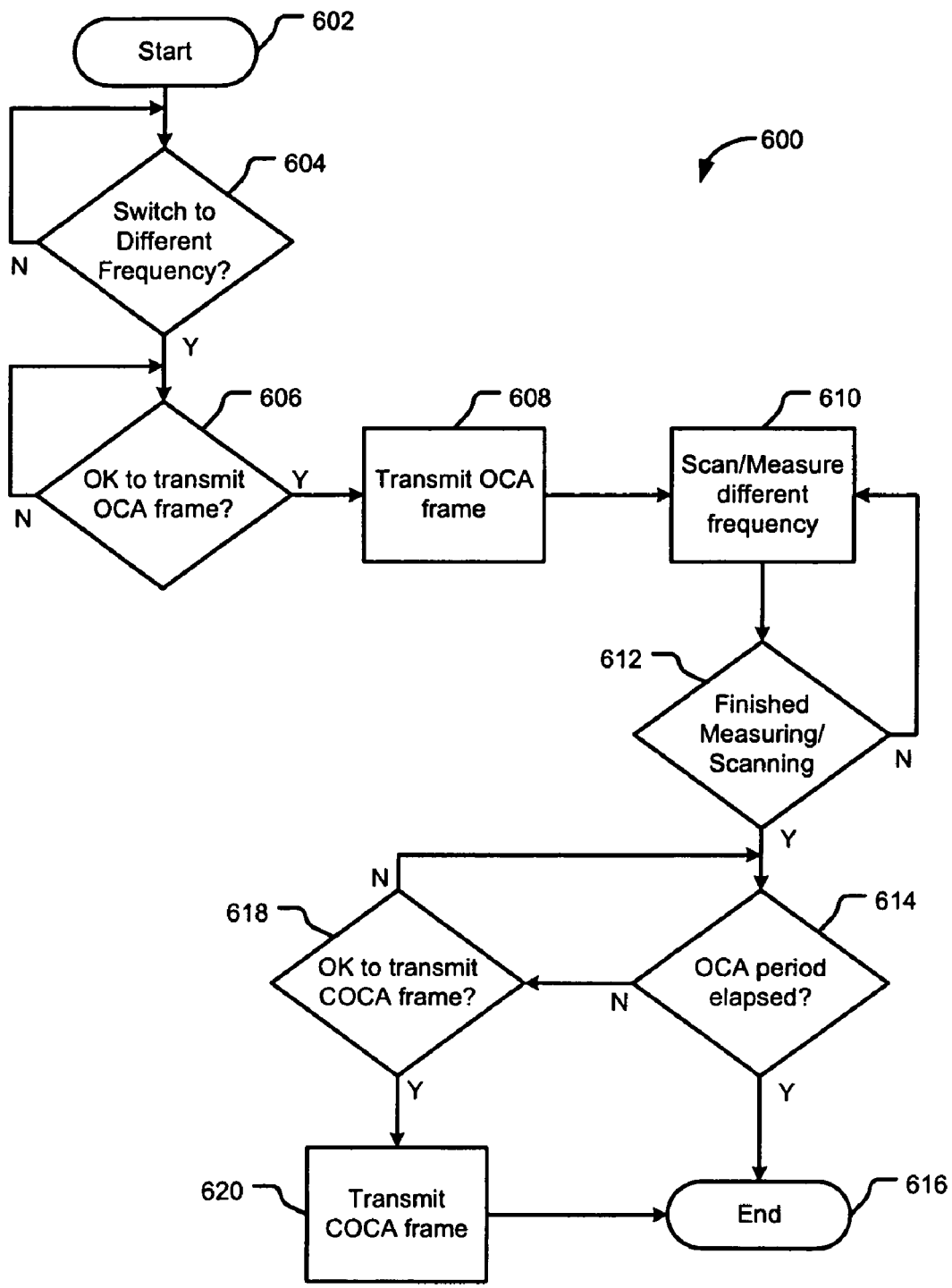
FIG. 21 is a flowchart illustrating exemplary steps taken by the off-channel module according to the present invention.

Referring now to FIG. 21, the OC module 556 may implement steps generally identified at 600. The process begins in step 602. In step 604, the OC module 556 determines whether a client station desires to switch to a different frequency. If the client station does not desire to switch to a different frequency, the process returns to step 604. However, if the client station desires to switch to a different frequency, the OC module 556 determines whether it can transmit the OCA frame so that all stations will receive it in step 606. If the OC module cannot transmit the OCA frame, the process returns to step 606. Otherwise, the OC module 556 transmits the OCA frame in step 608.

In step 610, the client station may switch to a different frequency and obtain measurements. The OC module 556 determines whether the client station is finished measuring the different frequency in step 612. If the client station is not finished measuring the different frequency, the process returns to step 610. If the client station has finished measuring the different frequency, the OC module 556 determines whether the period of time associated with the OCA frame has elapsed in step 614. If the period of time has elapsed, the process ends in step 616. If the period of time has not elapsed, the OC module 556 determines whether is can send a COCA frame to all of the client stations in step 618. If the OC module 556 cannot send a COCA frame to all the client stations, the process returns to step 614. Otherwise, the OC module 556 sends a COCA frame to all the client stations in step 620 and the process ends in step 616.

Figure 22:
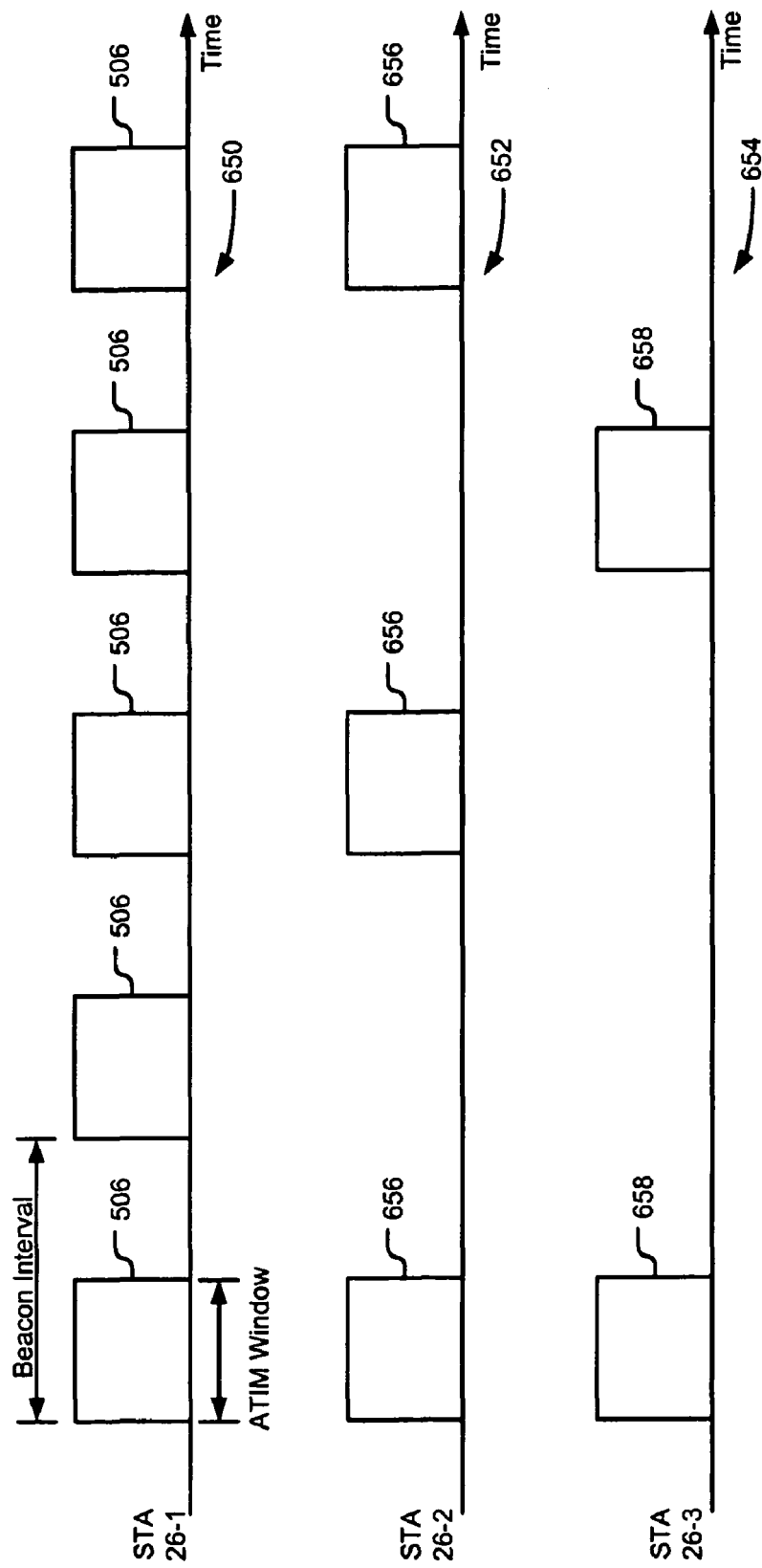
FIG. 22 is an exemplary timing diagram of three client stations in ad-hoc mode utilizing the listen interval module according to one embodiment the present invention.

Referring now to FIG. 22, exemplary timing diagrams 650, 652, 654 of client stations 26-1, 26-2, and 26-3 using the LI module 550 according to the present invention are illustrated. Stations 26-1, 26-2, and 26-3 have a listen interval of 1, 2, and 3 respectively. Although there is not any traffic being transferred between stations, each station periodically wakes up to transmit and/or receive an ATIM. Station 26-1 periodically wakes up at 506 to transmit and/or receive an ATIM. As shown, station 26-1 wakes up at the same interval at shown at 500 in FIG. 19 due to its listen interval. Station 26-2 has a listen interval of 2 and therefore wakes up every other ATIM window that follows a beacon as shown at 656. Station 26-3 has a listen interval of 3 and therefore wakes up every third ATIM window that follows a beacon as shown at 658. As shown, stations 26-2 and 26-3 wake up less often when using the LI module 550 and consequently consume less power.

Figure 23:
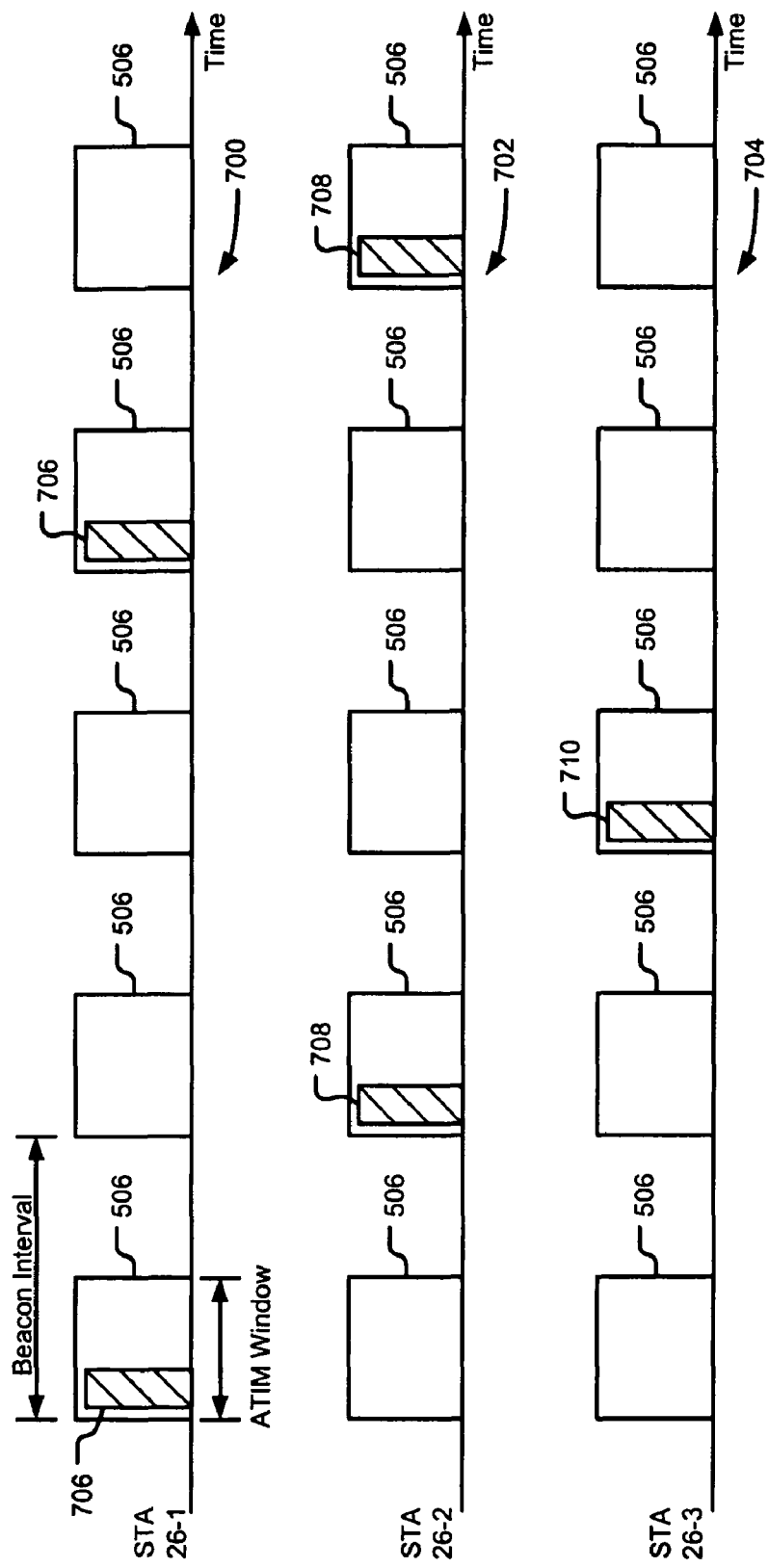
FIG. 23 is an exemplary timing diagram of three client stations in ad-hoc mode utilizing the contention avoidance module according to one embodiment of the present invention.

Referring now to FIG. 23, exemplary timing diagrams 700, 702, 704 of clients stations 26-1, 26-2, and 26-3 using the CA module 552 according to some embodiments the present invention are shown. As shown, the client stations 26-1, 26-2, and 26-3 periodically wake up for the ATIM window at 506 although there is not any data being transferred between them. However, due to the CA module 552 only one station is permitted to transmit for each ATIM window. The CA module 552 allows stations 26-1, 26-2, and 26-3 to transmit an ATIM at 706, 708, and 710 respectively. Since only one station transmits per ATIM window, there is extra time in each ATIM window that is not being utilized therefore the ATIM window may be reduced.

Figure 24:
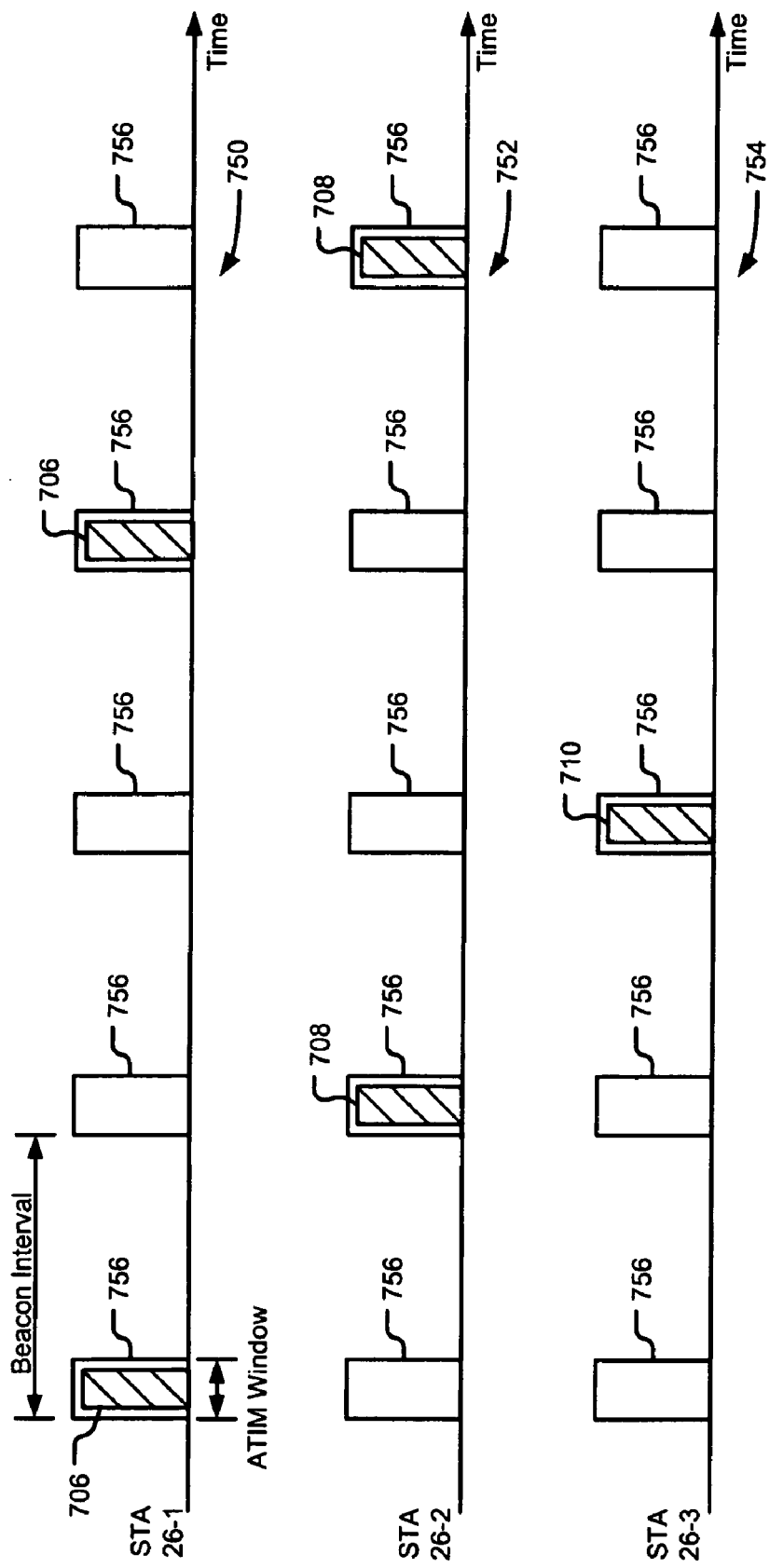
FIG. 24 is an exemplary timing diagram of three client stations in ad-hoc mode utilizing the contention avoidance module and a shortened announcement traffic indication message window according to one embodiment of the present invention.

Referring now to FIG. 24, exemplary timing diagrams 750, 752, 754 of clients stations 26-1, 26-2, and 26-3 using the CA module 552 with a shorted ATIM window are shown. As shown the client stations 26-1, 26-2, and 26-3 periodically wake up at 756 to transmit and/or receive an ATIM frame. The time that the client stations 26-1, 26-2, and 26-3 are awake to transmit and/or receive an ATIM has been reduced due to the shortened ATIM window and therefore each client station consumes less power.

Figure 25:
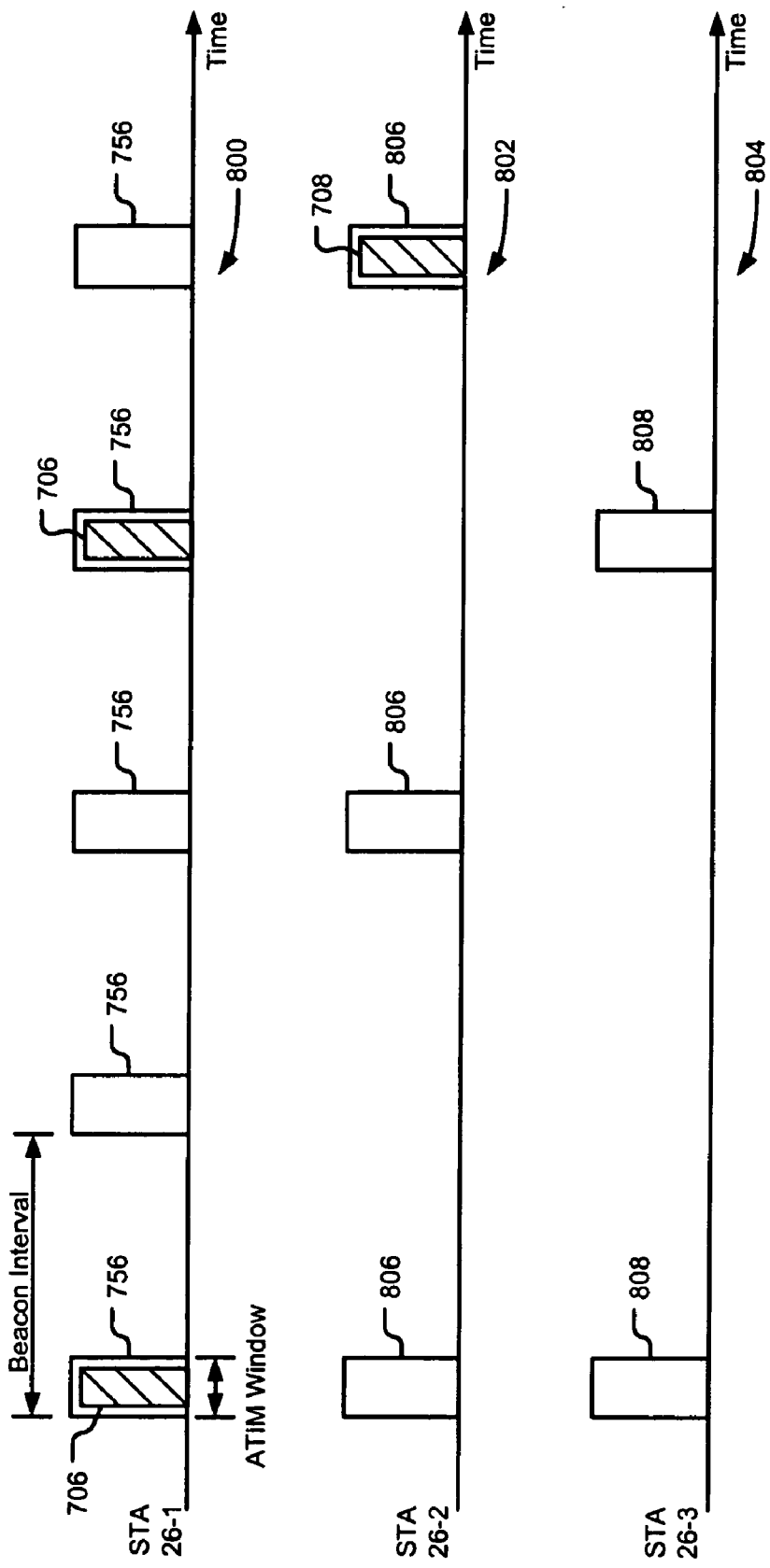
FIG. 25 is an exemplary timing diagram of three client stations in ad-hoc mode utilizing the listen interval module and the contention avoidance module according to one embodiment of the present invention.

Referring now to FIG. 25, exemplary timing diagrams 800, 802, 804 of clients stations 26-1, 26-2, and 26-3 using the LI module 550 and the CA module 552 according to some embodiments of the present invention are shown. Stations 26-1, 26-2, and 26-3 have a listen interval of 1, 2, and 3 respectively. Although there is not any traffic being transferred between stations, each station periodically wakes up for a shortened ATIM window to transmit and/or receive an ATIM frame. Station 26-1 periodically wakes up at 756 to transmit and/or receive an ATIM frame. As shown, station 26-1 wakes up at the same interval at shown at 506 in FIG. 19 due to its listen interval. Station 26-2 wakes up every other ATIM window that follows a beacon as shown at 806 due to its listen interval. Station 26-3 wakes up every third ATIM window that follows a beacon as shown at 808 due to its listen interval. As shown, stations 26-2 and 26-3 wake up less often when using the LI module 550 in addition to the CA module 552 and therefore consume less power.

Figure 26:
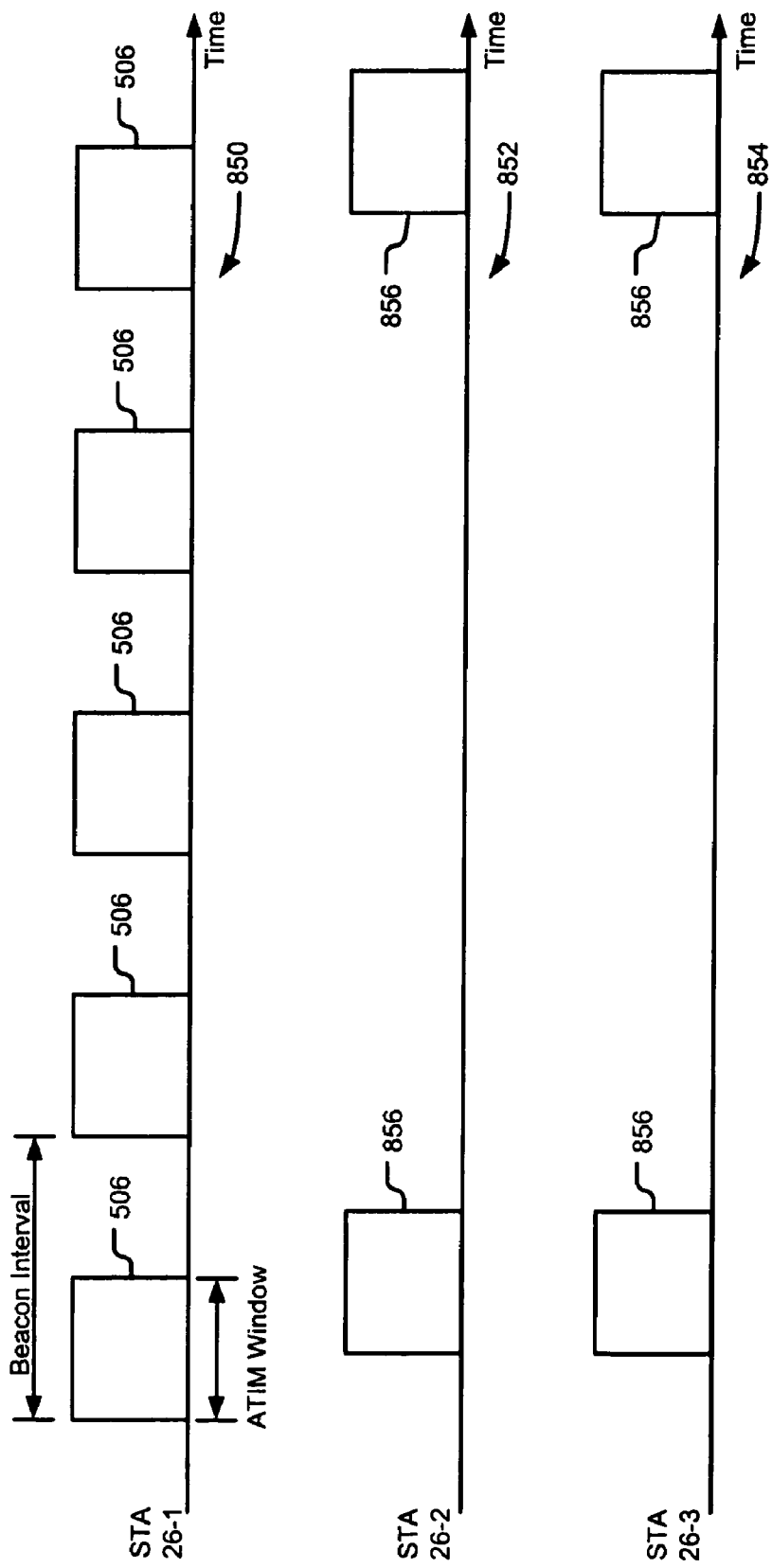
FIG. 26 is an exemplary timing diagram of three client stations in ad-hoc mode utilizing the power save delivery module according to one embodiment of the present invention.

Referring now to FIG. 26, exemplary timing diagrams 850, 852, and 854 of client stations 26-1, 26-2, and 26-3 are shown. Stations 26-2 and 26-3 are using the PSD module 554 and have determined a transmission schedule that is independent of the beacon and/or ATIM window. Station 26-1 periodically wakes up at 506 to transmit and/or receive ATIMs. However, stations 26-2 and 26-3 only wake up according to the transmission schedule at 856. As shown, stations 26-2 and 26-3 wake up less often than station 26-1 and therefore consume less power.

Figure 27A:
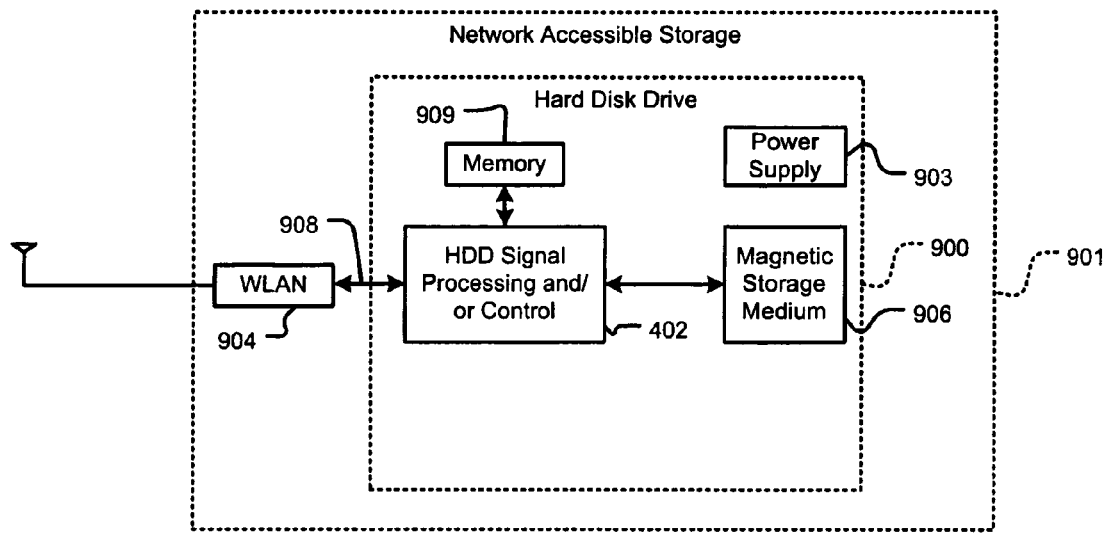
FIG. 27A is an exemplary implementation of the present invention in a network accessed storage module.

Referring now to FIGS. 26A-26G, various exemplary implementations of the present invention are shown. Referring now to FIG. 27A, the present invention can be implemented in a network accessed storage module (NAS) 901 that includes a hard disk drive 900. The present invention may implement and/or be implemented in a WLAN module, which is generally identified in FIG. 27A at 904. In some implementations, signal processing and/or control circuit 902 and/or other circuits (not shown) in the HDD 900 may process data, communicate with WLAN module 904, perform coding and/or encryption, perform calculations, and/or format data that is output to and/or received from a magnetic storage medium 906.

The HDD 900 may communicate with another networked device (not shown) such as a computer, a mobile computing device such as a personal digital assistant, cellular phone, media or MP3 player and the like, and/or other device via one or more wired links 908 and/or WLAN module 904. The HDD 900 may be connected to memory 909 such as random access memory (RAM), low latency nonvolatile memory such as flash memory, read only memory (ROM) and/or other suitable electronic data storage. The HDD 900 may also include a power supply module 903.

Figure 27B:
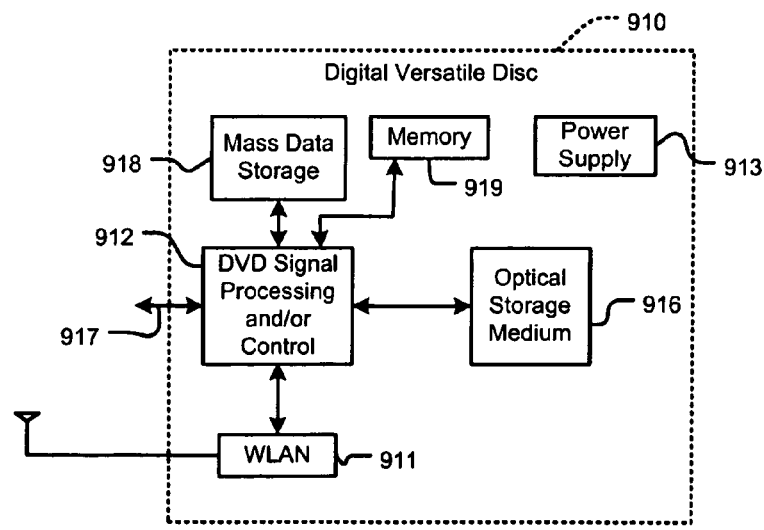
FIG. 27B is an exemplary implementation of the present invention in a digital versatile disc drive.

Referring now to FIG. 27B, the present invention can be implemented in a digital versatile disc (DVD) drive 910. The present invention may implement and/or be implemented in a WLAN module which is generally identified in FIG. 27B at 911. Signal processing and/or control circuit 912 and/or other circuits (not shown) in the DVD drive 910 may process data, perform coding and/or encryption, perform calculations, and/or format data that is read from and/or data written to an optical storage medium 916. In some implementations, the signal processing and/or control circuit 912 and/or other circuits (not shown) in the DVD drive 910 can also perform other functions such as encoding and/or decoding and/or any other signal processing functions associated with a DVD drive.

The DVD drive 910 may communicate with an output device (not shown) such as a computer, television or other device via one or more wired links 917 and/or wireless links via WLAN module 911. The DVD drive 910 may communicate with mass data storage 918 that stores data in a nonvolatile manner. The mass data storage 918 may include a hard disk drive (HDD). The HDD may have the configuration shown in FIG. 27A. The HDD may be a mini HDD that includes one or more platters having a diameter that is smaller than approximately 1.8". The DVD drive 910 may be connected to memory 919 such as RAM, ROM, low latency nonvolatile memory such as flash memory and/or other suitable electronic data storage. The DVD drive 910 may also include a power supply 913.

Figure 27C:
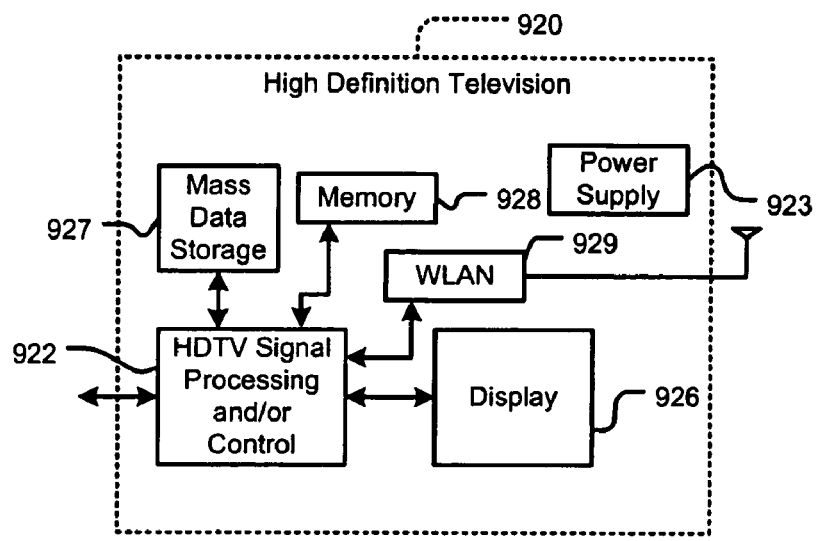
FIG. 27C is an exemplary implementation of the present invention in a high definition television.

Referring now to FIG. 27C, the present invention can be implemented in a high definition television (HDTV) 920. The present invention may implement and/or be implemented in either or both signal processing and/or control circuits, which are generally identified in FIG. 27E at 922, and a WLAN interface 929.

The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, perform calculations, format data and/or perform any other type of HDTV processing that may be required.

The HDTV 920 may communicate with mass data storage 927 that stores data in a nonvolatile manner such as optical and/or magnetic storage devices. At least one HDD may have the configuration shown in FIG. 27A and/or at least one DVD may have the configuration shown in FIG. 27B. The HDD may be a mini HDD that includes one or more platters having a diameter that is smaller than approximately 1.8". The HDTV 920 may be connected to memory 928 such as RAM, ROM, low latency nonvolatile memory such as flash memory and/or other suitable electronic data storage. The HDTV 920 also may include a power supply 923.

Figure 27D:
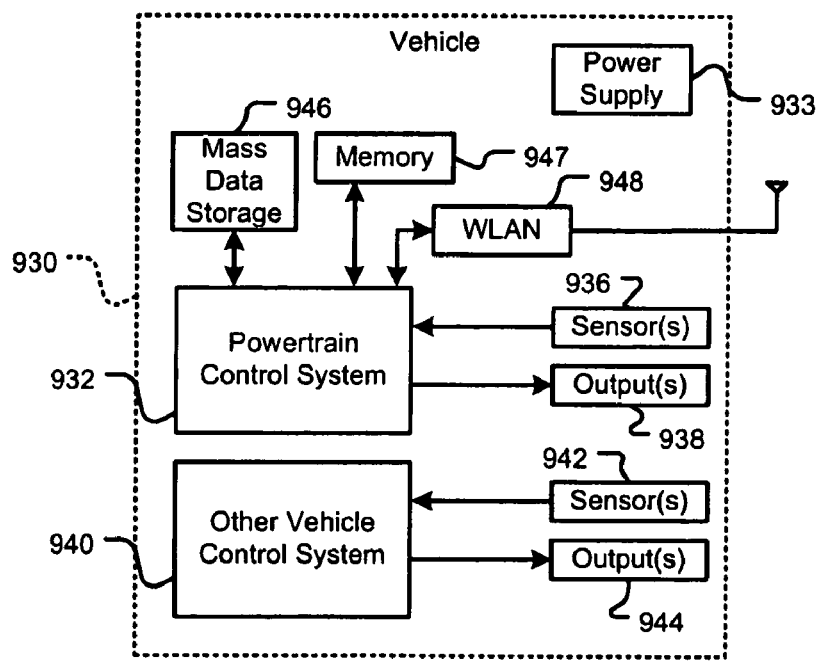
FIG. 27D is an exemplary implementation of the present invention in a wireless local area network device associated with a vehicle.

Referring now to FIG. 27D, the present invention may implement and/or be implemented in a WLAN interface 948 of a vehicle 930. A powertrain control system 932 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 940 of the vehicle 930. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 27A and/or at least one DVD may have the configuration shown in FIG. 27B. The HDD may be a mini HDD that includes one or more platters having a diameter that is smaller than approximately 1.8". The powertrain control system 932 may be connected to memory 947 such as RAM, ROM, low latency nonvolatile memory such as flash memory and/or other suitable electronic data storage. The powertrain control system 932 also may support connections with a WLAN via WLAN interface 948. Vehicle 930 may also include a power supply 933.

Figure 27E:
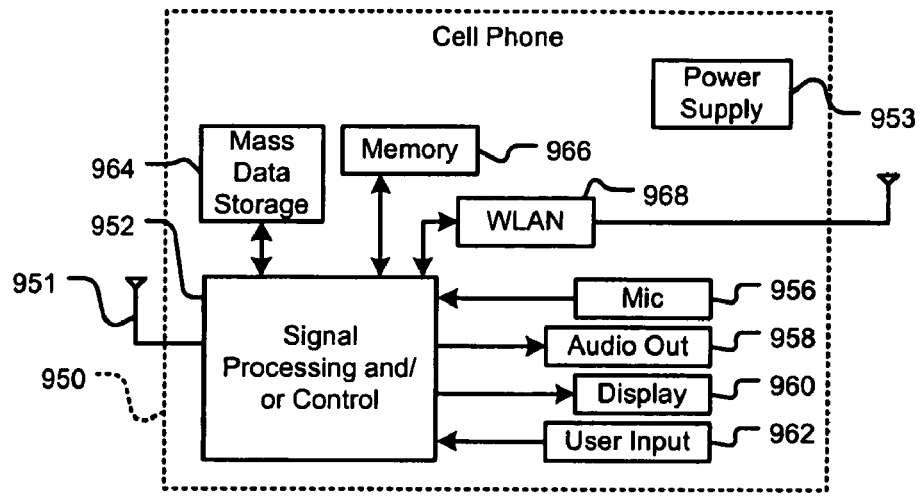
FIG. 27E is an exemplary implementation of the present invention in a cellular phone.

Referring now to FIG. 27E, the present invention can be implemented in a cellular phone 950 that may include a cellular antenna 951. The present invention may implement and/or be implemented in a WLAN interface 968. In some implementations, the cellular phone 950 includes a microphone 956, an audio output 958 such as a speaker and/or audio output jack, a display 960 and/or an input device 962 such as a keypad, pointing device, voice actuation and/or other input device. The signal processing and/or control circuits 952 and/or other circuits (not shown) in the cellular phone 950 may process data, perform coding and/or encryption, perform calculations, format data and/or perform other cellular phone functions.

The cellular phone 950 may communicate with mass data storage 964 that stores data in a nonvolatile manner such as optical and/or magnetic storage devices for example hard disk drives HDD and/or DVDs. At least one HDD may have the configuration shown in FIG. 27A and/or at least one DVD may have the configuration shown in FIG. 27B. The HDD may be a mini HDD that includes one or more platters having a diameter that is smaller than approximately 1.8". The cellular phone 950 may be connected to memory 966 such as RAM, ROM, low latency nonvolatile memory such as flash memory and/or other suitable electronic data storage. The cellular phone 950 also may support connections with a WLAN via WLAN interface 968. Cellular phone 950 may also include a power supply 953.

Figure 27F:
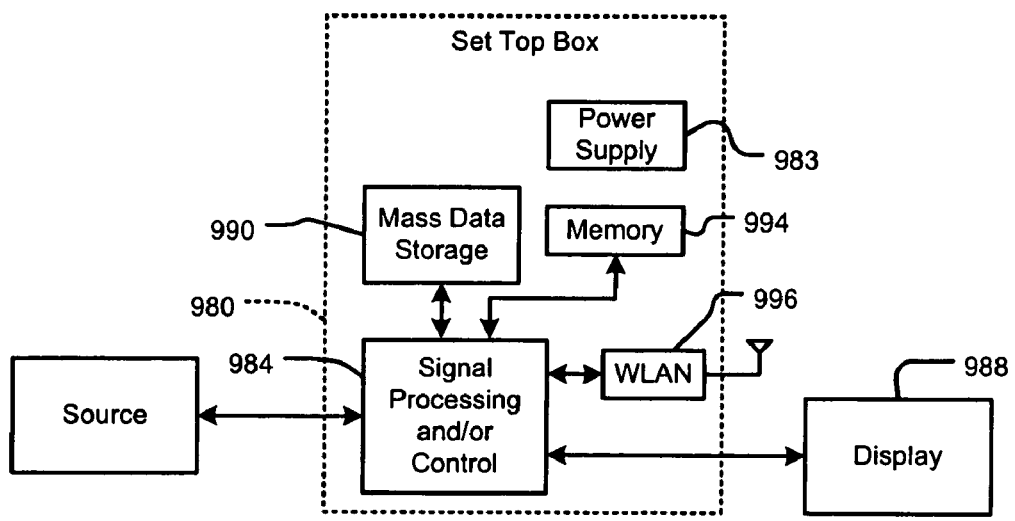
FIG. 27F is an exemplary implementation of the present invention in a set top box.

Referring now to FIG. 27F, the present invention can be implemented in a set top box 480. The present invention may implement and/or be implemented in a WLAN interface 996. The set top box 980 receives signals from a source such as a broadband source and outputs standard and/or high definition audio/video signals suitable for a display 988 such as a television and/or monitor and/or other video and/or audio output devices. The signal processing and/or control circuits 984 and/or other circuits (not shown) of the set top box 980 may process data, perform coding and/or encryption, perform calculations, format data and/or perform any other set top box function.

The set top box 980 may communicate with mass data storage 990 that stores data in a nonvolatile manner. The mass data storage 990 may include optical and/or magnetic storage devices for example hard disk drives HDD and/or DVDs. At least one HDD may have the configuration shown in FIG. 27A and/or at least one DVD may have the configuration shown in FIG. 27B. The HDD may be a mini HDD that includes one or more platters having a diameter that is smaller than approximately 1.8". The set top box 980 may be connected to memory 994 such as RAM, ROM, low latency nonvolatile memory such as flash memory and/or other suitable electronic data storage. The set top box 980 also may support connections with a WLAN via WLAN interface 996. Set top box 980 may also include a power supply 983.

Figure 27G:
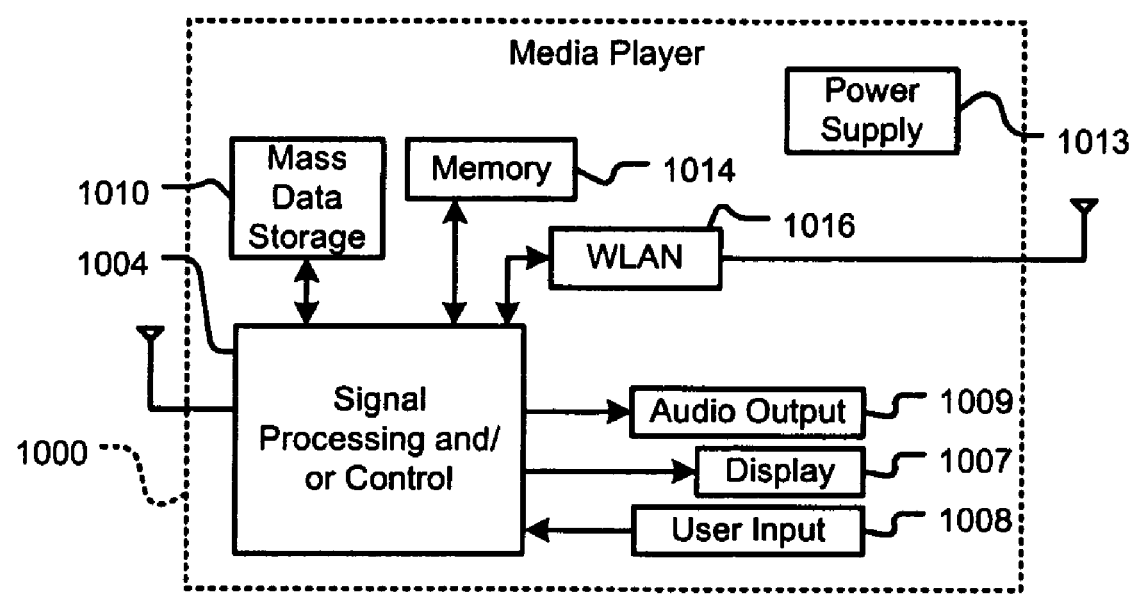
FIG. 27G is an exemplary implementation of the present invention in a media player.

Referring now to FIG. 27G, the present invention can be implemented in a media player 1000. The present invention may implement and/or be implemented in a WLAN interface 1016. In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack. The signal processing and/or control circuits 1004 and/or other circuits (not shown) of the media player 1000 may process data, perform coding and/or encryption, perform calculations, format data and/or perform any other media player function.

The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 27A and/or at least one DVD may have the configuration shown in FIG. 27B. The HDD may be a mini HDD that includes one or more platters having a diameter that is smaller than approximately 1.8". The media player 1000 may be connected to memory 514 such as RAM, ROM, low latency nonvolatile memory such as flash memory and/or other suitable electronic data storage. The media player 1000 also may support connections with a WLAN via WLAN interface 1016. Media player 1000 may also include a power supply 1013. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A wireless network device comprising:
    a base band processor (BBP) including
        a BBP receiver configured to determine whether a signal includes a frame, and
        a BBP transmitter;
    a media access controller (MAC) configured to communicate with the BBP, wherein the MAC includes
        a MAC receiver configured to identify a destination address in the frame, and
        a MAC transmitter;
    a processor configured to communicate with the MAC; and
    a power management module configured to
        transition the BBP receiver to an active mode based on an estimated energy level of the signal,
            wherein the power management module is configured to transition the BBP receiver to the active mode before transitioning the MAC receiver, the processor, the MAC transmitter, and the BBP transmitter to the active mode;
        transition the MAC receiver to the active mode when the frame is present,
            wherein the power management module is configured to transition the MAC receiver to the active mode (i) after transitioning the BBP receiver to the active mode and (ii) before transitioning the processor, the MAC transmitter, and the BBP transmitter to the active mode; and
        transition the processor to the active mode based on the destination address,
            wherein the power management module is configured to transition the processor to the active mode (i) after transitioning the BBP receiver and the MAC receiver to the active mode and (ii) before transitioning the MAC transmitter and the BBP transmitter to the active mode.

2. The wireless network device of claim 1, further comprising a radio frequency (RF) receiver configured to
    receive the signal,
    communicate the signal to the BBP, and
    estimate the energy level.

3. The wireless network device of claim 2, wherein the power management module is configured to periodically transition the RF receiver to the active mode based on a target beacon transmission time.

4. The wireless network device of claim 1, wherein the power management module is configured to transition the BBP receiver to the active mode when the energy level is greater than a predetermined energy threshold.

5. The wireless network device of claim 3, wherein the power management module is configured to transition the RF receiver to an inactive mode when the energy level is less than a predetermined energy threshold.

6. The wireless network device of claim 2, wherein the power management module is configured to transition the BBP receiver and the RF receiver to an inactive mode when the signal does not include the frame.

7. The wireless network device of claim 1, wherein the power management module is configured to transition the processor to the active mode when the destination address matches a predetermined address.

8. The wireless network device of claim 3, wherein the power management module is configured to transition the MAC receiver, the BBP receiver, and the RF receiver to an inactive mode when the destination address does not match a predetermined address.

9. The wireless network device of claim 1, wherein the power management module is configured to transition the MAC transmitter to the active mode when the processor transitions to the active mode.

10. The wireless network device of claim 9, wherein the power management module is configured to transition the BBP transmitter to the active mode when the MAC transmitter transitions to the active mode.

11. The wireless network device of claim 10, further comprising an RF transmitter configured to transmit an RF signal, wherein the power management module is configured to transition the RF transmitter to the active mode when the BBP transmitter transitions to the active mode.

12. A method of powering up a network device, the method comprising:
    estimating an energy level of a signal;
    determining whether the signal includes a frame;
    identifying a destination address in the frame; and
    transitioning a receiver of a base band processor (BBP receiver) to an active mode based on the energy level;
    transitioning a receiver of a media access controller (MAC receiver) to the active mode when the frame is present;
    transitioning a processor to the active mode based on the destination address;
    transitioning the BBP receiver to the active mode before transitioning the MAC receiver, the processor, a MAC transmitter, and a BBP transmitter to the active mode;
    transitioning the MAC receiver to the active mode (i) after transitioning the BBP receiver to the active mode and (ii) before transitioning the processor, the MAC transmitter, and the BBP transmitter to the active mode; and
    transitioning the processor to the active mode (i) after transitioning the BBP receiver and the MAC receiver to the active mode and (ii) before transitioning the MAC transmitter and the BBP transmitter to the active mode.

13. The method of claim 12, further comprising transitioning a radio frequency (RF) receiver to the active mode based on a target beacon transmission time.

14. The method of claim 13, further comprising transitioning the BBP receiver to the active mode when the energy level is greater than a predetermined energy threshold.

15. The method of claim 13, further comprising transitioning the RF receiver to an inactive mode when the energy level is less than a predetermined energy threshold.

16. The method of claim 14, further comprising transitioning the BBP receiver and the RF receiver to an inactive mode when the signal does not include the frame.

17. The method of claim 12, further comprising transitioning the processor to the active mode when the destination address matches a predetermined address.

18. The method of claim 13, further comprising transitioning the MAC receiver, the receiver of the BBP, and the RF receiver to an inactive mode when the destination address does not match a predetermined address.

19. The method of claim 12, further comprising transitioning the MAC transmitter to the active mode when the processor transitions to the active mode.

20. The method of claim 19, further comprising transitioning a BBP transmitter to the active mode when the MAC transmitter transitions to the active mode.

21. The method of claim 20, further comprising transitioning a RF transmitter to the active mode when the BBP transmitter transitions to the active mode.

22. A network device comprising:
a radio frequency (RF) receiver configured to
prior to receiving a beacon, switch to an active mode to detect an energy of a RF signal, and
switch to an inactive mode if the energy of the RF signal is less than a predetermined threshold;
a physical layer (PHY) receiver configured to
switch to the active mode to detect a preamble in a frame of the RF signal if (i) the RF receiver is in the active mode and (ii) the energy of the RF signal is greater than or equal to the predetermined threshold, and
switch to the inactive mode if the preamble is invalid,
wherein the RF receiver is further configured to switch to the inactive mode if the preamble is invalid;
a medium access controller (MAC) receiver configured to
switch to the active mode to detect a destination address in the frame if (i) the RF receiver and the PHY receiver are in the active mode and (ii) the preamble is valid, and
switch to the inactive mode if the destination address is invalid,
wherein the RF receiver and the PHY receiver are further configured to switch to the inactive mode if the destination address is invalid;
a processor configured to
switch to the active mode to determine whether to transmit a response to the frame if (i) the RF receiver, the PHY receiver, and the MAC receiver are in the active mode and (ii) the destination address is valid, and
switch to the inactive mode if the processor determines not to transmit the response,
wherein the RF receiver, the PHY receiver, and the MAC receiver are further configured to switch to the inactive mode if the processor determines not to transmit the response; and
a MAC transmitter, a PHY transmitter, and a RF transmitter each configured to
switch to the active mode to transmit the response if (i) the RF receiver, the PHY receiver, the MAC receiver, and the processor are in the active mode and (ii) the processor decides to transmit the response, and
switch to the inactive mode after transmitting the response,
wherein the RF receiver, the PHY receiver, the MAC receiver, and the processor are further configured to switch to the inactive mode after the response is transmitted.

* * * * *